United States Patent
Thuilliez et al.

(10) Patent No.: US 10,647,848 B2
(45) Date of Patent: May 12, 2020

(54) RUBBER COMPOSITION WITH A HIGH LEVEL OF FLUIDITY BASED ON AN AROMATIC ALDEHYDE AND AN AROMATIC POLYPHENOL

(71) Applicant: COMPAGNIE GENERALE DES ETABLISSEMENTS MICHELIN, Clermont-Ferrand (FR)

(72) Inventors: Anne-Lise Thuilliez, Clermont-Ferrand (FR); Odile Gavard-Lonchay, Clermont-Ferrand (FR); David Doisneau, Clermont-Ferrand (FR); Cedric Loubat, Castries (FR); Quentin Crouzet, Castries (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 137 days.

(21) Appl. No.: 16/061,740

(22) PCT Filed: Dec. 12, 2016

(86) PCT No.: PCT/FR2016/053329
§ 371 (c)(1),
(2) Date: Jun. 13, 2018

(87) PCT Pub. No.: WO2017/103404
PCT Pub. Date: Jun. 22, 2017

(65) Prior Publication Data
US 2018/0362754 A1  Dec. 20, 2018

(30) Foreign Application Priority Data
Dec. 14, 2015  (FR) ...................... 15 62292

(51) Int. Cl.
| | | |
|---|---|---|
| C08L 61/12 | (2006.01) | |
| B60C 1/00 | (2006.01) | |
| C08L 83/06 | (2006.01) | |
| C08K 3/013 | (2018.01) | |
| C07F 7/08 | (2006.01) | |
| C08L 7/00 | (2006.01) | |
| C08J 3/24 | (2006.01) | |
| C08L 19/00 | (2006.01) | |
| C08G 77/14 | (2006.01) | |
| C08G 77/00 | (2006.01) | |

(52) U.S. Cl.
CPC ............ *C08L 61/12* (2013.01); *B60C 1/0008* (2013.01); *B60C 1/0041* (2013.01); *C07F 7/0838* (2013.01); *C08J 3/24* (2013.01); *C08K 3/013* (2018.01); *C08L 7/00* (2013.01); *C08L 19/006* (2013.01); *C08L 83/06* (2013.01); *C08G 77/14* (2013.01); *C08G 77/80* (2013.01)

(58) Field of Classification Search
CPC .......... C08K 3/013; C08J 3/24; B60C 1/0008; B60C 1/0041; C08L 7/00; C08L 61/12; C08L 83/06; C08L 19/006; C07F 7/0838

USPC .......................................... 523/156
See application file for complete search history.

(56) References Cited

U.S. PATENT DOCUMENTS

| | | | |
|---|---|---|---|
| 4,031,288 A | * | 6/1977 | Bhakuni .................... C08J 5/06 428/395 |
| 7,199,175 B2 | | 4/2007 | Vasseur |
| 7,250,463 B2 | | 7/2007 | Durel et al. |
| 7,820,771 B2 | | 10/2010 | Lapra et al. |
| 7,900,667 B2 | | 3/2011 | Vasseur |
| 9,840,644 B2 | | 12/2017 | Doisneau et al. |
| 9,938,434 B2 | | 4/2018 | Doisneau |
| 10,005,929 B2 | | 6/2018 | Doisneau et al. |
| 2003/0212185 A1 | | 11/2003 | Vasseur |
| 2005/0004297 A1 | | 1/2005 | Durel et al. |
| 2007/0112120 A1 | | 5/2007 | Vasseur |
| 2008/0132644 A1 | | 6/2008 | Lapra et al. |
| 2009/0270558 A1 | | 10/2009 | Gandon-Pain et al. |
| 2011/0038815 A1 | | 2/2011 | Hansch et al. |
| 2014/0235125 A1 | * | 8/2014 | Doisneau ............... C09J 107/02 442/149 |
| 2016/0251550 A1 | | 9/2016 | Michoud et al. |
| 2017/0166010 A1 | | 6/2017 | Michoud et al. |

(Continued)

FOREIGN PATENT DOCUMENTS

| | | |
|---|---|---|
| WO | 97/36724 A2 | 10/1997 |
| WO | 99/16600 A1 | 4/1999 |
| WO | 02/10269 A2 | 2/2002 |
| WO | 03/016387 A1 | 2/2003 |
| WO | 2006/069792 A1 | 7/2006 |
| WO | 2006/069793 A1 | 7/2006 |
| WO | 2013/017422 A1 | 2/2013 |
| WO | 2015/118042 A1 | 8/2015 |

*Primary Examiner* — Doris L Lee
(74) *Attorney, Agent, or Firm* — Venable LLP

(57) ABSTRACT

A rubber composition comprises at least one phenol-aldehyde resin based on: at least one aromatic polyphenol comprising at least one aromatic ring bearing at least two —O—H groups in the meta position relative to one another, the two positions ortho to at least one of the —O—H groups being unsubstituted; and at least one aldehyde of formula W:

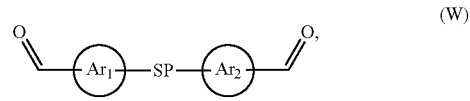

wherein each $Ar_1$ and $Ar_2$ group represents, independently of one another, an optionally substituted aromatic ring; and wherein SP is a connecting group that connects at least the $Ar_1$ and $Ar_2$ groups to one another, SP separating the $Ar_1$ and $Ar_2$ groups by at least 2 covalent bonds.

27 Claims, 12 Drawing Sheets

(56) References Cited

U.S. PATENT DOCUMENTS

| | | |
|---|---|---|
| 2017/0362370 A1 | 12/2017 | Doisneau et al. |
| 2018/0009972 A1 | 1/2018 | Doisneau et al. |
| 2018/0016433 A1 | 1/2018 | Doisneau et al. |
| 2018/0118983 A1 | 5/2018 | Doisneau et al. |
| 2018/0273670 A1 | 9/2018 | Thuilliez et al. |
| 2019/0077952 A1 | 3/2019 | Thuilliez et al. |
| 2019/0177532 A1 | 6/2019 | Thuilliez et al. |

\* cited by examiner

RUBBER COMPOSITION WITH A HIGH LEVEL OF FLUIDITY BASED ON AN AROMATIC ALDEHYDE AND AN AROMATIC POLYPHENOL

FIELD OF THE INVENTION

The invention relates to rubber compositions, a method for manufacturing these compositions, a rubber composite and a tyre.

RELATED ART

It is known to use, in some parts of the tyres, rubber compositions having high stiffness during small strains of the tyre. Resistance to small strains is one of the properties which a tyre must have in order to respond to the stresses to which it is subjected.

High stiffness may be obtained using what is referred to as a concentrated vulcanization system, that is to say especially comprising relatively high contents of sulfur and of vulcanization accelerator.

Nonetheless, such a concentrated vulcanization system detrimentally affects the uncured ageing of the composition. Thus, when the composition is in the form of a semi-finished product, for example of a rubber strip, the sulfur may migrate to the surface of the semi-finished product. This phenomenon, referred to as blooming, leads to a detrimental effect on the green tack of the semi-finished product during prolonged storage thereof, with, as consequence, degradation of the adhesion between the semi-finished products during manufacture of the tyre.

Moreover, storage of the uncured composition containing a concentrated vulcanization system is liable to lead to a reduction in the delay phase of the composition during vulcanization thereof, that is to say the time preceding the start of vulcanization. Consequently, the composition may begin to cure prematurely in certain forming tools and the vulcanization kinetics are liable to be altered and the vulcanization efficiency to be reduced.

Such a concentrated vulcanization system also detrimentally affects ageing in the cured state. Indeed, degradation of the mechanical properties of the cured composition is observed, especially at the limits, for example of the elongation at break.

High stiffness may otherwise be obtained by increasing the content of reinforcing filler.

Nonetheless, in a known way, increasing the stiffness of a rubber composition by increasing the content of filler may detrimentally affect the hysteresis properties and thus the rolling resistance properties of tyres. However, it is an ongoing aim to lower the rolling resistance of tyres in order to reduce the consumption of fuel and thus to protect the environment.

Finally, high stiffness may be obtained by incorporating certain reinforcing resins, as disclosed in WO 02/10269.

Conventionally, the increase in stiffness is obtained by incorporating reinforcing resins based on a methylene acceptor/donor system. The terms "methylene acceptor" and "methylene donor" are well known to those skilled in the art and are widely used to denote compounds capable of reacting together to generate, by condensation, a three-dimensional reinforcing resin which will become superimposed and interpenetrated with the reinforcing filler/elastomer network, on the one hand, and with the elastomer/sulfur network, on the other hand (if the crosslinking agent is sulfur). The methylene acceptor is combined with a hardener, capable of crosslinking or curing it, also commonly known as a methylene donor. Examples of such a methylene acceptor and donor are described in WO 02/10269.

The methylene donors conventionally used in rubber compositions for tyres are hexamethylenetetramine (abbreviated to HMT) or hexamethoxymethylmelamine (abbreviated to HMMM or H3M) or hexaethoxymethylmelamine.

The methylene acceptors conventionally used in rubber compositions for tyres are pre-condensed phenolic resins.

Nonetheless, the combination of phenolic resin, conventionally used as methylene acceptor, with HMT or H3M as methylene donor produces formaldehyde during the vulcanization of the rubber composition. However, it is desirable to reduce, or even eliminate in the long run, formaldehyde from rubber compositions due to the environmental impact of these compounds and the recent developments in regulations, especially European regulations, relating to this type of compound.

The objective of the invention is to provide a rubber composition which is stiffened by means of low-environmental-impact compounds.

SUMMARY OF THE INVENTION

To this end, a subject of the invention is a rubber composition comprising at least one phenol-aldehyde resin based:
- on at least one aromatic polyphenol comprising at least one aromatic ring bearing at least two —O—H groups in the meta position relative to one another, the two positions ortho to at least one of the —O—H groups being unsubstituted; and
- on at least one aldehyde of formula W:

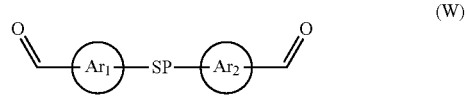

in which:
  each $Ar_1$ and $Ar_2$ group represents, independently of one another, an optionally substituted aromatic ring; and
  SP is a connecting group that connects at least the $Ar_1$ and $Ar_2$ groups to one another, SP separating the $Ar_1$ and $Ar_2$ groups by at least 2 covalent bonds.

The combination of the aldehyde and of the aromatic polyphenol of the composition according to the invention makes it possible to obtain rubber compositions having an equivalent or even vastly improved stiffness at low strain compared to conventional rubber compositions which comprise methylene donors HMT or H3M and compared to the rubber compositions devoid of reinforcing resin.

Owing to the particular structure of the aldehyde of the phenol-aldehyde resin, the fluidity of the rubber composition may be adjusted so as to make the latter processable and enable the shaping thereof under conventional industrial conditions. Indeed, one problem linked to the use of certain reinforcing resins from the prior art is the reduction in the fluidity of the rubber composition in the uncured state. Indeed, after the step of manufacturing the rubber composition comprising the constituents of the reinforcing resin, the composition in the uncured state is shaped for example by calendering, for example in the form of a sheet or a slab, or else is extruded, for example to form a rubber profiled element. Yet, by reducing the fluidity of the rubber composition in the uncured state, certain reinforcing resins from the prior art hamper the shaping of the rubber composition under conventional industrial conditions.

The inventors behind the invention put forward the hypothesis that the SP group acts as group that structurally relaxes the aldehyde and therefore that makes it possible to increase the fluidity of the rubber composition. Moreover, unlike the reinforcing resins from the prior art, obtaining this fluidity does not prevent rubber compositions that have a vastly improved stiffness at low strain, compared to conventional rubber compositions, from being obtained. Thus, the invention makes it possible to increase the fluidity without reducing the stiffness, or even while increasing it.

Furthermore, the aldehyde of formula W is very advantageous since it makes it possible to avoid the production of formaldehyde, unlike conventional methylene donors. Specifically, the combination of phenolic resin conventionally used as methylene acceptor with HMT or H3M as methylene donor in the prior art produces formaldehyde during the vulcanization of the rubber composition by curing. However, it is desirable to reduce, or even eliminate in the long run, formaldehyde from rubber compositions due to the environmental impact of these compounds and the recent developments in regulations, especially European regulations, relating to this type of compound.

The expression "resin based on" should, of course, be understood as meaning a resin comprising the mixture and/or the reaction product of the various base constituents used for this resin, it being possible for some of them to be intended to react or capable of reacting with one another or with their immediate chemical surroundings, at least partly, during the various phases in the method for manufacturing the composition, the composites or the tyre, in particular during a curing step. Thus, provision could also be made for the aromatic polyphenol and/or the aldehyde of formula W to be derived from a precursor respectively of this aromatic polyphenol and/or the aldehyde of formula W.

"Meta position relative to one another" is intended to mean that the —O—H hydroxyl groups are borne by carbons of the aromatic ring which are separated from one another by a single other carbon of the aromatic ring.

"Position ortho to a group" is intended to mean the position occupied by the carbon of the aromatic ring which is immediately adjacent to the carbon of the aromatic ring bearing the group.

"Aromatic ring" is understood to mean a ring that obeys Hückel's rule. Examples of aromatic rings are monocyclic or polycyclic, substituted or unsubstituted aromatic hydrocarbons, such as benzene, monocyclic or polycyclic, substituted or unsubstituted aromatic heterocycles, such as furan, pyrrole, thiophene and pyridine.

"Covalent bond" is understood to mean a bond connecting two atoms together, each atom bringing one electron into play in the case of a single bond and several in the case of a double or triple bond. Thus, within the meaning of the present invention, a covalent bond may be single, double or triple. In other words, SP comprises a first atom connected to the $Ar_1$ group and a second atom connected to the $Ar_2$ group respectively by at least one bond, whether it is single, double or triple, it being possible for the first and second atoms to be one and the same atom. Thus, by way of example, in the case where SP represents a methylene radical or oxygen, SP is necessarily connected to each $Ar_1$ and $Ar_2$ group by a single bond.

The rubber composition thus comprises at least one (that is to say, one or more) phenol-aldehyde resin; this phenol-aldehyde resin being based on at least one (that is to say, one or more) aldehyde and at least one (that is to say, one or more) aromatic polyphenol, which constituents will be described in detail below.

In the present description, unless expressly indicated otherwise, all the percentages (%) shown are percentages by weight. The acronym "phr" signifies parts by weight per hundred parts of elastomer.

Furthermore, any range of values denoted by the expression "between a and b" represents the range of values extending from more than a to less than b (in other words excluding the limits a and b), whereas any range of values denoted by the expression "from a to b" means the range of values extending from the limit "a" as far as the limit "b", in other words including the strict limits "a" and "b".

Within the context of the invention, the carbon-based products mentioned in the description may be of fossil or biobased origin. In the latter case, they may partially or completely result from biomass or be obtained from renewable starting materials resulting from biomass.

Another subject of the invention is a rubber composition comprising:
  at least one aromatic polyphenol comprising at least one aromatic ring bearing at least two —O—H groups in the meta position relative to one another, the two positions ortho to at least one of the —O—H groups being unsubstituted; and
  at least one aldehyde of formula W:

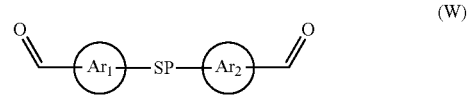

(W)

in which:
  each $Ar_1$ and $Ar_2$ group represents, independently of one another, an optionally substituted aromatic ring; and
  SP is a connecting group that connects at least the $Ar_1$ and $Ar_2$ groups to one another, SP separating the $Ar_1$ and $Ar_2$ groups by at least 2 covalent bonds.

Another subject of the invention is a method for manufacturing a rubber composition in the uncured state, the method comprising a step of mixing:
  at least one aromatic polyphenol comprising at least one aromatic ring bearing at least two —O—H groups in the meta position relative to one another, the two positions ortho to at least one of the —O—H groups being unsubstituted; and
  at least one aldehyde of formula W:

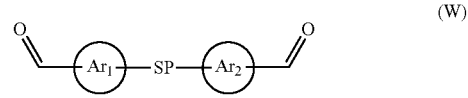

(W)

in which:
  each $Ar_1$ and $Ar_2$ group represents, independently of one another, an optionally substituted aromatic ring; and
  SP is a connecting group that connects at least the $Ar_1$ and $Ar_2$ groups to one another, SP separating the $Ar_1$ and $Ar_2$ groups by at least 2 covalent bonds.

Preferably, during the mixing step, at least one elastomer is also mixed into the composition.

Another subject of the invention is a method for manufacturing a rubber composition in the cured state, the method comprising:

a step of manufacturing a rubber composition in the uncured state comprising a step of mixing:
at least one aromatic polyphenol comprising at least one aromatic ring bearing at least two —O—H groups in the meta position relative to one another, the two positions ortho to at least one of the groups being unsubstituted; and
at least one aldehyde of formula W:

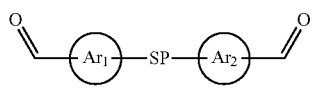

(W)

in which:
each $Ar_1$ and $Ar_2$ group represents, independently of one another, an optionally substituted aromatic ring; and
SP is a connecting group that connects at least the $Ar_1$ and $Ar_2$ groups to one another, SP separating the $Ar_1$ and $Ar_2$ groups by at least 2 covalent bonds,
then, a step of shaping the rubber composition in the uncured state,
then, a step of vulcanizing the rubber composition during which a phenol-aldehyde resin based on the aromatic polyphenol and on the aldehyde is crosslinked.

Alternatively, the step of crosslinking by vulcanizing or curing may be replaced by a step of crosslinking using a crosslinking system other than sulfur.

Yet another subject of the invention is a rubber composition capable of being obtained by a method as described above.

Another subject of the invention is the use of an aldehyde of formula W:

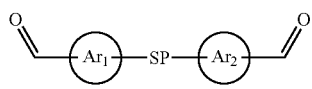

(W)

in which:
each $Ar_1$ and $Ar_2$ group represents, independently of one another, an optionally substituted aromatic ring; and
SP is a connecting group that connects at least the $Ar_1$ and $Ar_2$ groups to one another, SP separating the $Ar_1$ and $Ar_2$ groups by at least 2 covalent bonds,
in a rubber composition comprising a phenol-aldehyde resin based on at least one aromatic polyphenol and on at least the aldehyde for increasing the stiffness of the rubber composition.

The invention also relates to the use of the aldehyde of formula W:

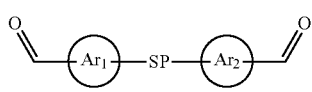

(W)

in which:
each $Ar_1$ and $Ar_2$ group represents, independently of one another, an optionally substituted aromatic ring; and
SP is a connecting group that connects at least the $Ar_1$ and $Ar_2$ groups to one another, SP separating the $Ar_1$ and $Ar_2$ groups by at least 2 covalent bonds,
for increasing the fluidity in the uncured state of a rubber composition comprising a phenol-aldehyde resin based on at least one aromatic polyphenol and on at least the aldehyde.

Another subject of the invention is the use of the aldehyde of formula W:

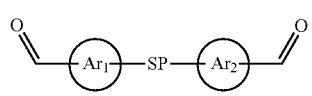

(W)

in which:
each $Ar_1$ and $Ar_2$ group represents, independently of one another, an optionally substituted aromatic ring; and
SP is a connecting group that connects at least the $Ar_1$ and $Ar_2$ groups to one another, SP separating the $Ar_1$ and $Ar_2$ groups by at least 2 covalent bonds,
for retaining the stiffness with the increase in temperature of a rubber composition comprising a phenol-aldehyde resin based on at least one aromatic polyphenol and on at least the aldehyde.

Another subject of the invention is a rubber composite reinforced with at least one reinforcing element embedded in a rubber composition as described above.

Another subject of the invention is a tyre comprising a rubber composition as described above or a rubber composite as described above.

DETAILED DESCRIPTION OF THE INVENTION

Figure 1:
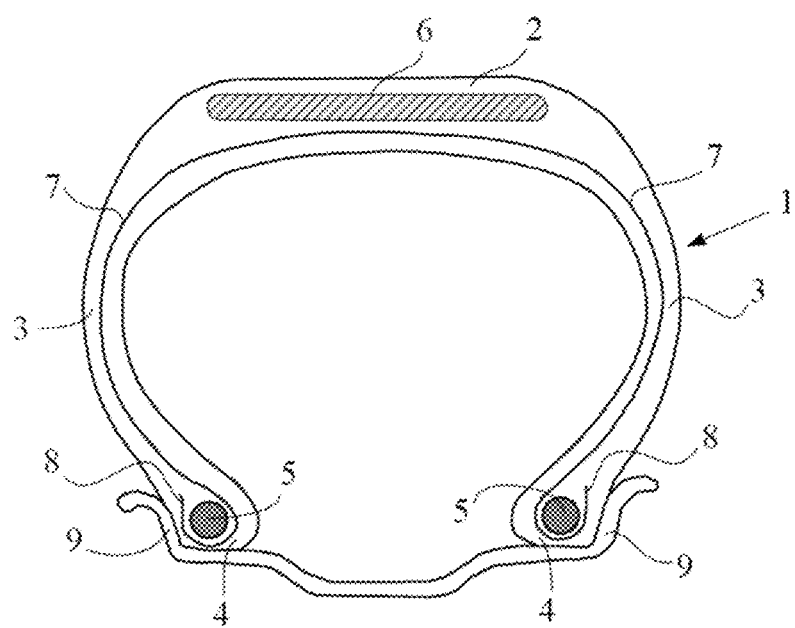
FIG. 1 represents schematically (without being true to a specific scale) a radial section of a tire in accordance with the invention for a vehicle of the heavy-duty type.

Rubber composition is intended to mean that the composition comprises at least one elastomer or a rubber (the two terms being synonymous) and at least one other component. A rubber composition thus comprises a matrix of elastomer or of rubber in which at least the other component is dispersed. A rubber composition is in a plastic state in the uncured (non-crosslinked) state and in an elastic state in the cured (crosslinked) state, but never in a liquid state. A rubber composition must not be confused with an elastomer latex, which is a composition in a liquid state comprising a liquid solvent, generally water, and at least one elastomer or a rubber dispersed in the liquid solvent so as to form an emulsion. Thus, the rubber composition is not an aqueous adhesive composition.

Aldehyde of the Rubber Composition

In accordance with the invention, the composition comprises one or more aldehyde(s) of formula W.

The SP connecting group, which is by definition divalent, separates the $Ar_1$ and $Ar_2$ groups by at least 2 covalent bonds, that is to say that the shortest path for connecting the $Ar_1$ and $Ar_2$ groups to one another comprises at least 2 covalent bonds, it being possible for each of these covalent bonds, independently of one another, to be a single, double or triple bond. SP therefore implicitly comprises at least one atom connected on the one hand to $Ar_1$ and on the other hand to $Ar_2$.

Preferably, SP represents an at least divalent radical selected from the group consisting of a hydrocarbon-based radical and a substituted hydrocarbon-based radical. Such radicals may optionally be interrupted by one or more heteroatoms, preferably one or more heteroatoms selected from the group consisting of O, S, Si and P.

The SP connecting group is preferentially devoid of a function that is reactive with respect to the aromatic polyphenol.

The SP connecting group is preferentially devoid of a function that is reactive with respect to the other constituents of the rubber composition.

A reactive function is understood here to mean a function that would react under reaction conditions necessary for the crosslinking of the phenol-aldehyde resin.

In one embodiment, the aldehyde is of formula W1:

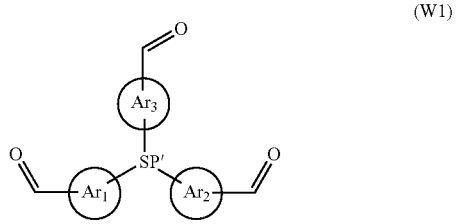

(W1)

in which:
each $Ar_1$, $Ar_2$, $Ar_3$ group represents an optionally substituted aromatic ring;
SP' connects the $Ar_1$, $Ar_2$ and $Ar_3$ groups to one another, SP' separating, in twos, the $Ar_1$, $Ar_2$ and $Ar_3$ groups by at least 2 covalent bonds.

Such an aldehyde has a branched SP group that makes it possible to create an additional crosslinking node in the network created by the phenol-aldehyde resin. Thus, the stiffness of the rubber composition in the cured state is increased.

Preferably, SP' represents an at least trivalent radical selected from the group consisting of a hydrocarbon-based radical and a substituted hydrocarbon-based radical. Such radicals may optionally be interrupted by one or more heteroatoms, preferably one or more heteroatoms selected from the group consisting of O, S, Si and P.

Advantageously, in this embodiment where the aldehyde is of formula W1, the SP' group represents a group of formula SP1:

(SP1)

with $Y_1$, $Y_2$, $Y_3$ each representing, independently of one another, a group selected from the group consisting of oxygen, a $CH_2$ group, a C=O group, an S=O group and an $SO_2$ group, preferably from the group consisting of oxygen, a C=O group, an S=O group and an $SO_2$ group, and more preferentially $Y_1$, $Y_2$, $Y_3$ each representing oxygen. In this embodiment, $Y_1$, $Y_2$, $Y_3$ preferably directly connect Z and $Ar_1$, $Ar_2$, $Ar_3$ respectively.

Advantageously, in this other embodiment where the aldehyde is of formula W1, SP represents a group of formula SP1:

(SP1)

with Z representing a trivalent radical selected from the group consisting of a hydrocarbon-based radical and a substituted hydrocarbon-based radical. Such a trivalent radical may optionally be interrupted by one or more heteroatoms, preferably one or more heteroatoms selected from the group consisting of O, S, Si and P.

Advantageously, Z represents a trivalent radical selected from the group consisting of:
alkyltriyl, aryltriyl, arylalkyltriyl, alkylaryltriyl, cycloalkyltriyl and alkenyltriyl radicals,

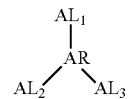

radicals with $AL_1$, $AL_2$, $AL_3$, representing, independently of one another, an alkylene divalent radical and AR representing an aryltriyl trivalent radical;

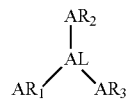

radicals with AR$_1$, AR$_2$, AR$_3$, representing, independently of one another, an arylene divalent radical and AL representing an alkyltriyl trivalent radical.

Preferably, Z represents a trivalent radical selected from the group consisting of:

alkyltriyl radicals,

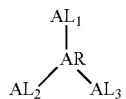

radicals with AL$_1$, AL$_2$, AL$_3$, representing, independently of one another, an alkylene divalent radical and AR representing an aryltriyl tetravalent radical;

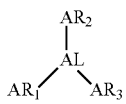

radicals with AR$_1$, AR$_2$, AR$_3$, representing, independently of one another, an arylene divalent radical and AL representing an alkyltriyl trivalent radical.

More preferentially, Z represents an alkyltriyl trivalent radical.

Even more advantageously, Z represents a branched alkyltriyl trivalent radical comprising a number of carbon atoms ranging from 1 to 15, preferably from 2 to 12 and more preferentially from 2 to 8.

In yet another embodiment, the aldehyde is of formula W2:

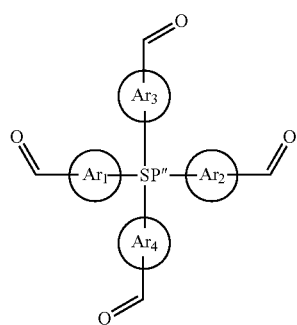

in which:
each Ar$_1$, Ar$_2$, Ar$_3$ and Ar$_4$ group represents, independently of one another, an optionally substituted aromatic ring;
SP'' connects the Ar$_1$, Ar$_2$, Ar$_3$ and Ar$_4$ groups to one another, SP'' separating, in twos, the Ar$_1$, Ar$_2$, Ar$_3$ and Ar$_4$ groups by at least 2 covalent bonds.

Such an aldehyde has a branched SP'' group that makes it possible to create an additional crosslinking node in the network created by the phenol-aldehyde resin. Thus, the stiffness of the rubber composition in the cured state is increased.

Preferably, SP'' represents an at least divalent radical selected from the group consisting of a hydrocarbon-based radical and a substituted hydrocarbon-based radical. Such radicals may optionally be interrupted by one or more heteroatoms, preferably one or more heteroatoms selected from the group consisting of O, S, Si and P.

Advantageously, in this other embodiment where the aldehyde is of formula W2, the SP'' group represents a group of formula SP2:

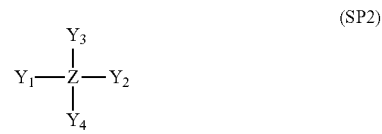

with Y$_1$, Y$_2$, Y$_3$, Y$_4$ each representing, independently of one another, a group selected from the group consisting of oxygen, a CH$_2$ group, a C=O group, an S=O group and an SO$_2$ group, preferably from the group consisting of oxygen, a C=O group, an S=O group and an SO$_2$ group, and more preferentially Y$_1$, Y$_2$, Y$_3$, Y$_4$ each representing oxygen. In this embodiment, Y$_1$, Y$_2$, Y$_3$, Y$_4$ preferably directly connect Z and Ar$_1$, Ar$_2$, Ar$_3$ and Ar$_4$ respectively.

Advantageously, in this other embodiment where the aldehyde is of formula W2, SP represents a group of formula SP2:

with Z representing a tetravalent radical selected from the group consisting of a hydrocarbon-based radical and a substituted hydrocarbon-based radical. Such a tetravalent radical may optionally be interrupted by one or more heteroatoms, preferably one or more heteroatoms selected from the group consisting of O, S, Si and P.

Advantageously, Z represents a tetravalent radical selected from the group consisting of:
alkyltetrayl, aryltetrayl, arylalkyltetrayl, alkylaryltetrayl, cycloalkyltetrayl and alkenyltetrayl radicals,

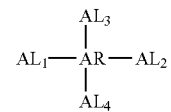

radicals with AL$_1$, AL$_2$, AL$_3$, AL$_4$ representing, independently of one another, an alkylene divalent radical and AR representing an aryltetrayl tetravalent radical; and

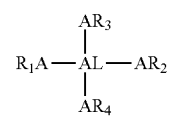

radicals with AR$_1$, AR$_2$, AR$_3$, AR$_4$ representing, independently of one another, an arylene divalent radical and AL representing an alkyltetrayl tetravalent radical.

Preferably, Z represents a tetravalent radical selected from the group consisting of:

alkyltetrayl radicals,

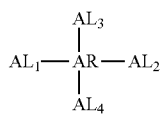

radicals with $AL_1$, $AL_2$, $AL_3$, $AL_4$ representing, independently of one another, an alkylene divalent radical and AR representing an aryltetrayl tetravalent radical; and

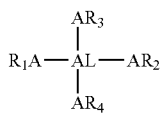

radicals with $AR_1$, $AR_2$, $AR_3$, $AR_4$ representing, independently of one another, an arylene divalent radical and AL representing an alkyltetrayl tetravalent radical.

More preferentially, Z represents an alkyltetrayl tetravalent radical.

Even more advantageously, Z represents a branched alkyltetrayl tetravalent radical comprising a number of carbon atoms ranging from 1 to 15, preferably from 2 to 12 and more preferentially from 2 to 8.

Advantageously, SP separates the $Ar_1$ and $Ar_2$ groups by a number of covalent bonds less than or equal to 150, preferably less than or equal to 100 and more preferentially less than or equal to 75. In the embodiments using aldehydes of formula W1 and W2, each SP' and SP" group separates, in twos, the $Ar_1$, $Ar_2$ and $Ar_3$ and $Ar_1$, $Ar_2$, $Ar_3$ and $Ar_4$ groups respectively by a number of covalent bonds less than or equal to 150, preferably less than or equal to 100 and more preferentially less than or equal to 75. The temperature resistance, that is to say the stiffness retention with the increase in temperature, of the rubber composition decreases when the distance between the aromatic rings becomes too large. Thus, depending on the use of the rubber composition, a suitable distance will be able to be chosen. Preferentially, for certain tyre uses, a relatively high temperature resistance is desired.

Advantageously, SP separates the $Ar_1$ and $Ar_2$ groups by a number of covalent bonds greater than or equal to 3, preferably greater than or equal to 4 and more preferentially greater than or equal to 5. In the embodiments using aldehydes of formula W1 and W2, each SP' and SP" group separates, in twos, the $Ar_1$, $Ar_2$ and $Ar_3$ and $Ar_1$, $Ar_2$, $Ar_3$ and $Ar_4$ groups respectively by a number of covalent bonds greater than or equal to 3, preferably greater than or equal to 4 and more preferentially greater than or equal to 5. The fluidity of the rubber composition increases when the distance between the aromatic rings becomes relatively large. Thus, depending on the use of the rubber composition, a suitable distance will be able to be chosen.

In one embodiment, SP separates the $Ar_1$ and $Ar_2$ groups by a number of covalent bonds less than or equal to 20, preferably less than or equal to 15. In the embodiments using aldehydes of formula W1 and W2, each SP' and SP" group separates, in twos, the $Ar_1$, $Ar_2$ and $Ar_3$ and $Ar_1$, $Ar_2$, $Ar_3$ and $Ar_4$ groups respectively by a number of covalent bonds less than or equal to 20, preferably less than or equal to 15. In this embodiment, the compromise between the fluidity, the stiffness and the temperature resistance of the composition is favoured.

In another embodiment, SP separates the $Ar_1$ and $Ar_2$ groups by a number of covalent bonds strictly greater than 15. In the embodiments using aldehydes of formula W1 and W2, each SP' and SP" group separates, in twos, the $Ar_1$, $Ar_2$ and $Ar_3$ and $Ar_1$, $Ar_2$, $Ar_3$ and $Ar_4$ groups respectively by a number of covalent bonds strictly greater than 15. In this embodiment, the compromise between the fluidity and the stiffness of the composition is favoured.

Advantageously, SP comprises at least 2 successive single bonds, preferably at least 5 successive single bonds, more preferentially at least 10 successive single bonds. In the embodiments using aldehydes of formula W1 and W2, each SP' and SP" group separates, in twos, the $Ar_1$, $Ar_2$ and $Ar_3$ and $Ar_1$, $Ar_2$, $Ar_3$ and $Ar_4$ groups respectively by at least 2 successive single bonds, preferably at least 5 successive single bonds, more preferentially by at least 10 successive single bonds. For a number of given covalent bonds, the higher the number of single bonds, the more the fluidity is increased, without actually reducing the stiffness, or even by increasing it.

In one embodiment, SP separates the $Ar_1$ and $Ar_2$ groups by a number of successive single bonds less than or equal to 20, preferably less than or equal to 15. In the embodiments using aldehydes of formula W1 and W2, each SP' and SP" group separates, in twos, the $Ar_1$, $Ar_2$ and $Ar_3$ and $Ar_1$, $Ar_2$, $Ar_3$ and $Ar_4$ groups respectively by a number of successive single bonds less than or equal to 20, preferably less than or equal to 15.

In another embodiment, SP separates the $Ar_1$ and $Ar_2$ groups by a number of successive single bonds strictly greater than 15. In the embodiments using aldehydes of formula W1 and W2, each SP' and SP" group separates, in twos, the $Ar_1$, $Ar_2$ and $Ar_3$ and $Ar_1$, $Ar_2$, $Ar_3$ and $Ar_4$ groups respectively by a number of successive single bonds strictly greater than 15.

Advantageously, in one embodiment, the molar mass of the aldehyde of formula W is less than or equal to 500 $g \cdot mol^{-1}$.

Advantageously, in another embodiment, the molar mass of the aldehyde of formula W is less than or equal to 10 000 $g \cdot mol^{-1}$, preferably less than or equal to 5000 $g \cdot mol^{-1}$, and more preferentially less than or equal to 2000 $g \cdot mol^{-1}$.

Advantageously, the aldehyde is of formula W3:

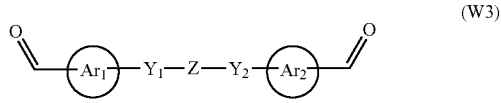

(W3)

in which $Y_1$—Z—$Y_2$ represents a divalent radical with $Y_1$ and $Y_2$ each representing, independently of one another, a group selected from the group consisting of oxygen, a $CH_2$ group, a C=O group, an S=O group and an $SO_2$ group, preferably from the group consisting of oxygen, a C=O group, an S=O group and an $SO_2$ group, and more preferentially $Y_1$ and $Y_2$ each representing oxygen.

In one particularly preferred embodiment, $Y_1$ and $Y_2$ are identical.

Advantageously, the aldehyde is of formula W3:

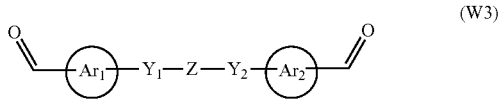
(W3)

in which $Y_1$—Z—$Y_2$ represents a divalent radical with Z representing a divalent radical selected from the group consisting of a hydrocarbon-based radical and a substituted hydrocarbon-based radical. Such a divalent radical may optionally be interrupted by one or more heteroatoms, preferably one or more heteroatoms selected from the group consisting of O, S, Si and P.

Advantageously, Z represents a divalent radical selected from the group consisting of the following radicals: alkylene, arylene, arylalkylene, alkylarylene, cycloalkylene, alkenylene, AL-AR-AL with AL representing alkyl monovalent radicals and AR representing an aryl group, AR-AL-AR with AR representing aryl monovalent radicals and AL representing an alkyl group.

Preferably, Z represents a divalent radical selected from the group consisting of the following radicals: alkylene, AL-AR-AL with AL representing alkyl monovalent radicals and AR representing an aryl group, AR-AL-AR with AR representing aryl monovalent radicals and AL representing an alkyl group.

More preferentially, Z represents an alkylene divalent radical.

Even more advantageously, Z represents a linear alkylene divalent radical comprising a number of carbon atoms ranging from 1 to 15, preferably from 2 to 12 and more preferentially from 2 to 8.

Advantageously, SP represents a radical selected from the group consisting of polyester, polyether, polydiene, polyalkylene and polysilicone radicals and the combinations of these radicals, preferably from the group consisting of polyether and polysilicone radicals and the combinations of these radicals.

A polyester radical is understood to mean a radical comprising a repeat unit comprising a main chain, the main chain of this unit comprising at least one ester function. The main chain is understood to mean the shortest sequence of atoms connecting the units, in twos, to one another. In one embodiment, the polyester radical is a radical of an aliphatic homopolyester. Such radicals are selected from the group consisting of the radicals of polyglycolide (PGA), poly(lactic acid) (PLA) and polycaprolactone (PCL).

In another embodiment, the polyester radical is a radical of an aliphatic copolyester. Such radicals are selected from the group consisting of the radicals of polyethylene adipate (PEA) and polybutylene succinate (PBS).

In yet another embodiment, the polyester radical is a radical of a semi-aromatic copolyester. Such radicals are selected from the group consisting of the radicals of polyethylene terephthalate (PET), polybutylene terephthalate (PBT), polytrimethylene terephthalate (PTT) and polyethylene naphthalate (PEN).

In yet another embodiment, the polyester radical is a radical of an aromatic homo-copolyester, such as the radicals of polyarylates.

A polyether radical is understood to mean a radical comprising a repeat unit comprising a main chain, the main chain of this unit comprising at least one ether function. The main chain is understood to mean the shortest sequence of atoms connecting the units, in twos, to one another.

Preferably, the polyether radical is of formula O—[$Z_4$—O—]$_n$, in which $Z_4$ is a divalent radical selected from the group consisting of a hydrocarbon-based radical and a substituted hydrocarbon-based radical. Such a radical may optionally be interrupted by one or more heteroatoms, preferably one or more heteroatoms selected from the group consisting of O, S, Si and P. The aldehyde of formula W then has the following formula W4:

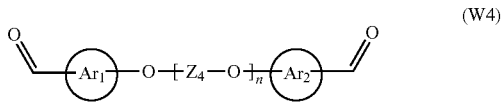
(W4)

in which n is greater than or equal to 1 and preferably greater than or equal to 2.

Preferably, $Z_4$ represents a divalent radical selected from the group consisting of the following radicals: alkylene, arylene, arylalkylene, alkylarylene, cycloalkylene, alkenylene, AL-AR-AL with AL representing alkyl monovalent radicals and AR representing an aryl group, AR-AL-AR with AR representing aryl monovalent radicals and AL representing an alkyl group.

More preferentially, $Z_4$ represents an alkylene divalent radical.

Even more preferentially, $Z_4$ represents a linear alkylene divalent radical.

A polydiene radical is understood to mean a radical comprising a repeat unit comprising a main chain, the main chain of this unit comprising at least one non-aromatic alkene function. A non-aromatic alkene function is understood to mean that the alkene function does not belong to an aromatic ring. The main chain is understood to mean the shortest sequence of atoms connecting the units, in twos, to one another.

A polyalkylene radical is understood to mean a radical comprising a repeat unit comprising a main chain, the main chain of this unit comprising at least one linear or branched alkyl radical, optionally substituted by one or more aromatic rings. The main chain is understood to mean the shortest sequence of atoms connecting the units, in twos, to one another.

A polysilicone radical is understood to mean a radical comprising a repeat unit comprising a main chain, the main chain of this unit comprising at least one siloxane radical. The main chain is understood to mean the shortest sequence of atoms connecting the units, in twos, to one another.

Preferably, the polysilicone radical is of formula $Z_5$:

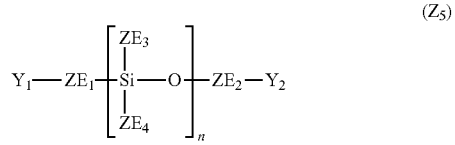
($Z_5$)

The aldehyde of formula W then has the following formula W5:

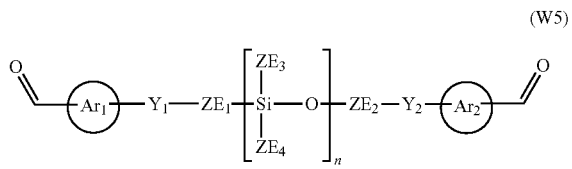

(W5)

in which n is greater than or equal to 1 and preferably greater than or equal to 2.

In one embodiment, the compound W5 is a mixture of compounds of formula W5, in which mixture several compounds of formula W5 respectively having different whole values of n can be mixed. A person skilled in the art understands that for such mixtures the compound of formula W5 has a non-whole value of n that is equal to the weighted molar average of all of the compounds of formula W5 in the mixture of compounds.

Advantageously, $Y_1$ and $Y_2$ each represent, independently of one another, a group selected from the group consisting of oxygen, a $CH_2$ group, a $C=O$ group, an $S=O$ group and an $SO_2$ group, preferably from the group consisting of oxygen, a $C=O$ group, an $S=O$ group and an $SO_2$ group, and more preferentially $Y_1$ and $Y_2$ each represent oxygen.

Advantageously, each $ZE_1$, $ZE_2$ radical represents, independently of one another, a divalent radical selected from the group consisting of a hydrocarbon-based radical and a substituted hydrocarbon-based radical. Such a radical may optionally be interrupted by one or more heteroatoms, preferably one or more heteroatoms selected from the group consisting of O, S, Si and P. Optionally, each $ZE_1$, $ZE_2$ radical represents, independently of one another, a divalent radical selected from the group consisting of the following radicals: alkylene, arylene, arylalkylene, alkylarylene, cycloalkylene, alkenylene, AL-AR-AL with AL representing alkyl monovalent radicals and AR representing an aryl group, AR-AL-AR with AR representing aryl monovalent radicals and AL representing an alkyl group.

Preferably, each $ZE_1$, $ZE_2$ radical represents, independently of one another, a divalent radical selected from the group consisting of the following radicals: alkylene, AL-AR-AL with AL representing alkyl monovalent radicals and AR representing an aryl group, AR-AL-AR with AR representing aryl monovalent radicals and AL representing an alkyl group.

More preferentially, each $ZE_1$, $ZE_2$ radical represents an alkylene divalent radical and even more preferentially each ZEN, $ZE_2$ radical represents a linear alkylene divalent radical. For example, each $ZE_1$, $ZE_2$ radical represents, independently of one another, a radical selected from the group consisting of methylene, ethylene, propylene and butylene radicals.

Advantageously, each $ZE_3$, $ZE_4$ radical represents, independently of one another, a monovalent radical selected from the group consisting of a hydrocarbon-based radical and a substituted hydrocarbon-based radical. Such a radical may optionally be interrupted by one or more heteroatoms, preferably one or more heteroatoms selected from the group consisting of O, S, Si and P. Optionally, each $ZE_3$, $ZE_4$ radical represents, independently of one another, a monovalent radical selected from the group consisting of alkyl, aryl, arylalkyl, alkylaryl, cycloalkyl and alkenyl radicals, and more preferentially each $ZE_3$, $ZE_4$ radical represents an alkyl monovalent radical. For example, each $ZE_3$, $ZE_4$ radical represents, independently of one another, a radical selected from the group consisting of methyl, ethyl, propyl and butyl radicals. The propyl radicals comprise the radicals of formula $—C_3H_7$. These radicals are n-propyl and isopropyl. The butyl radicals comprise the radicals of formula $—C_4H_9$. These radicals are n-butyl, isobutyl, sec-butyl and tert-butyl.

In one embodiment, the remainder of each $Ar_1$, $Ar_2$ aromatic ring is unsubstituted. Preferably, in this embodiment, when each $Ar_1$, $Ar_2$ aromatic ring is a benzene ring, the aldehyde is of formula W6:

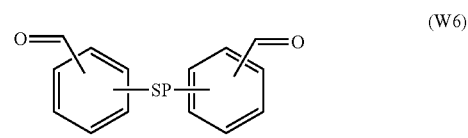

(W6)

In another embodiment, each $Ar_1$, $Ar_2$ aromatic ring is substituted respectively by at least one $K_1$, $K_2$ group representing, independently of one another, a monovalent radical selected from the group consisting of a hydrocarbon-based radical and a substituted hydrocarbon-based monovalent radical. Such a monovalent radical may optionally be interrupted by one or more heteroatoms, preferably one or more heteroatoms selected from the group consisting of O, S, Si and P. Preferably, each $K_1$, $K_2$ group represents, independently of one another, an alkyl monovalent radical or an O-alkyl monovalent radical. Preferably, in this embodiment, when each $Ar_1$, $Ar_2$ aromatic ring is a benzene ring, the aldehyde is of formula W7:

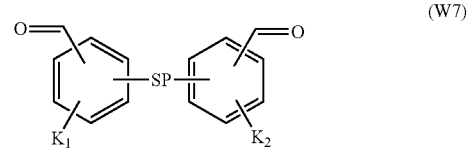

(W7)

In one embodiment, each $K_1$, $K_2$ group and the SP group are located in the ortho position relative to one another on each $Ar_1$, $Ar_2$ benzene aromatic ring.

Preferably, whether substituted or unsubstituted, each $Ar_1$, $Ar_2$ aromatic ring is a benzene ring. In one embodiment, the SP group and the CHO group are located in the para position relative to one another on each $Ar_1$ and $Ar_2$ aromatic ring. In one preferred embodiment and in order to increase the stiffness of the composition, the SP group and the CHO group are located in the ortho position relative to one another on each $Ar_1$ and $Ar_2$ aromatic ring. In one even more preferred embodiment and in order to further increase the stiffness of the composition, the SP group and each CHO group are located in the meta position relative to one another on each $Ar_1$ and $Ar_2$ aromatic ring.

In certain embodiments using aldehydes of formula W1, the remainder of each $Ar_1$, $Ar_2$ and $Ar_3$ aromatic ring is unsubstituted. Preferably, in this embodiment, when each $Ar_1$, $Ar_2$ and $Ar_3$ aromatic ring is a benzene ring, the aldehyde is of formula W8:

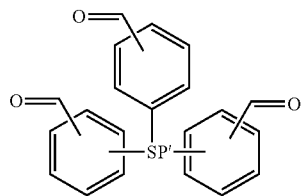

(W8)

In another embodiment, each $Ar_1$, $Ar_2$ and $Ar_3$ aromatic ring is substituted respectively by at least one $K_1$, $K_2$ and $K_3$ group representing, independently of one another, a monovalent radical selected from the group consisting of a hydrocarbon-based radical and a substituted hydrocarbon-based monovalent radical. Such a monovalent radical may optionally be interrupted by one or more heteroatoms, preferably one or more heteroatoms selected from the group consisting of O, S, Si and P. Preferably, each $K_1$, $K_2$ and $K_3$ group represents, independently of one another, an alkyl monovalent radical or an O-alkyl monovalent radical. Preferably, in this embodiment, when each $Ar_1$, $Ar_2$ and $Ar_3$ aromatic ring is a benzene ring, the aldehyde is of formula W9:

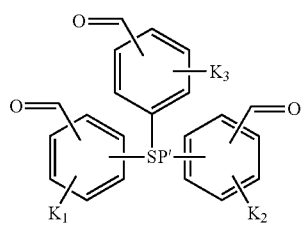

(W9)

In one embodiment, each $K_1$, $K_2$ and $K_3$ group and each SP' group are located in the ortho position relative to one another on each $Ar_1$, $Ar_2$ and $Ar_3$ benzene aromatic ring.

Preferably, whether substituted or unsubstituted, each $Ar_1$, $Ar_2$ and $Ar_3$ aromatic ring is a benzene ring. In one embodiment, the SP' group and the CHO group are located in the para position relative to one another on each $Ar_1$, $Ar_2$ and $Ar_3$ aromatic ring. In one preferred embodiment and in order to increase the stiffness of the composition, the SP' group and the CHO group are located in the ortho position relative to one another on each $Ar_1$, $Ar_2$ and $Ar_3$ aromatic ring. In one even more preferred embodiment and in order to further increase the stiffness of the composition, the SP' group and each CHO group are located in the meta position relative to one another on each $Ar_1$, $Ar_2$ and $Ar_3$ aromatic ring.

In certain embodiments using aldehydes of formula W2, the remainder of each $Ar_1$, $Ar_2$, $Ar_3$ and $Ar_4$ aromatic ring is unsubstituted. Preferably, in this embodiment, when each $Ar_1$, $Ar_2$, $Ar_3$ and $Ar_4$ aromatic ring is a benzene ring, the aldehyde is of formula W10:

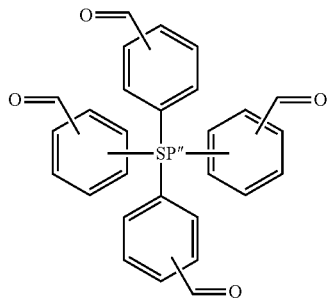

(W10)

In another embodiment, each $Ar_1$, $Ar_2$, $Ar_3$ and $Ar_4$ aromatic ring is substituted respectively by at least one $K_1$, $K_2$, $K_3$ and $K_4$ group representing, independently of one another, a monovalent radical selected from the group consisting of a hydrocarbon-based radical and a substituted hydrocarbon-based monovalent radical. Such a monovalent radical may optionally be interrupted by one or more heteroatoms, preferably one or more heteroatoms selected from the group consisting of O, S, Si and P. Preferably, each $K_1$, $K_2$, $K_3$ and $K_4$ group represents, independently of one another, an alkyl monovalent radical or an O-alkyl monovalent radical. Preferably, in this embodiment, when each $Ar_1$, $Ar_2$, $Ar_3$ and $Ar_4$ aromatic ring is a benzene ring, the aldehyde is of formula W11:

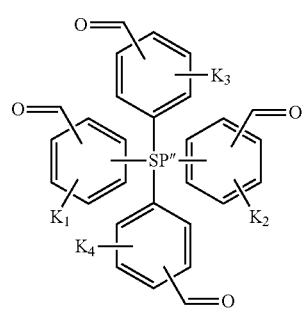

(W11)

In one embodiment, each $K_1$, $K_2$, $K_3$ and $K_4$ group and each SP'' group are located in the ortho position relative to one another on each $Ar_1$, $Ar_2$, $Ar_3$ and $Ar_4$ benzene aromatic ring.

Preferably, whether substituted or unsubstituted, each $Ar_1$, $Ar_2$, $Ar_3$ and $Ar_4$ aromatic ring is a benzene ring. In one embodiment, the SP'' group and the CHO group are located in the para position relative to one another on each $Ar_1$, $Ar_2$, $Ar_3$ and $Ar_4$ aromatic ring. In one preferred embodiment and in order to increase the stiffness of the composition, the SP'' group and the CHO group are located in the ortho position relative to one another on each $Ar_1$, $Ar_2$, $Ar_3$ and $Ar_4$ aromatic ring. In one even more preferred embodiment and in order to further increase the stiffness of the composition, the SP'' group and the CHO group are located in the meta position relative to one another on each $Ar_1$, $Ar_2$, $Ar_3$ and $Ar_4$ aromatic ring.

In one embodiment, the phenol-aldehyde resin is based on an additional aldehyde different from the aldehyde of formula W. The additional aldehyde makes it possible to adjust the properties of the rubber composition induced by the introduction of the phenol-aldehyde resin based on the aldehyde of formula W.

Advantageously, the additional aldehyde is an aromatic aldehyde. In the same way as for the aldehyde of formula W, such an aldehyde is very advantageous since it makes it possible to avoid the production of formaldehyde, unlike conventional methylene donors. An aromatic aldehyde is a compound containing at least one aromatic ring, this aromatic ring bearing at least one (one or more) aldehyde function.

Preferably, the aromatic aldehyde is selected from the group consisting of 1,3-benzenedicarboxaldehyde, 1,4-benzenedicarboxaldehyde and an aldehyde of formula A:

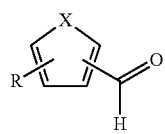
(A)

in which:
X comprises N, S or O,
R represents —H or —CHO,
and the mixtures of these compounds.

Preferentially, the aldehyde is of formula A':

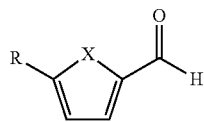
(A')

Even more preferentially, R represents —CHO.

According to a preferential embodiment, X represents O.

In a variant of the aldehyde of formula A, X represents O and R represents —H. The aldehyde used is then of formula Ba:

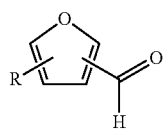
(Ba)

In a variant of the aldehyde of general formula A', X represents O and R represents —H. The aldehyde used is then furfuraldehyde and is of formula B'a:

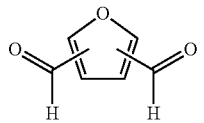
(B'a)

In another variant of the aldehyde of formula A, X represents O and R represents —CHO. The aldehyde used is then of formula Bb:

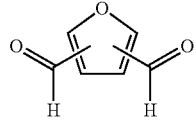
(Bb)

In another variant of the aldehyde of formula A', X represents O and R represents —CHO. The aldehyde used is then 2,5-furandicarboxaldehyde and is of formula B'b:

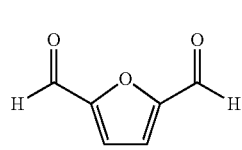
(B'b)

In another embodiment, X comprises N.

In a variant of the aldehyde of formula A, X represents NH. The aldehyde used is of formula Ca:

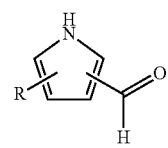
(Ca)

In a variant of the aldehyde of formula A', X represents NH. The aldehyde used is of formula C'a:

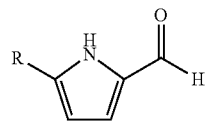
(C'a)

R preferably represents —CHO in the variant of the aldehyde of formula C'a and the aldehyde obtained is then 2,5-1H-pyrroledicarboxaldehyde.

In another variant of the aldehyde of formula A, X represents NR1 with R1 representing a radical selected from the group consisting of alkyl, aryl, arylalkyl, alkylaryl and cycloalkyl radicals. The aldehyde used is of formula Cb:

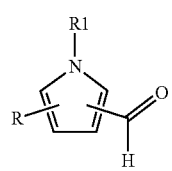
(Cb)

In another embodiment, X comprises S.

In a variant of the aldehyde of formula A, X represents S. The aldehyde used is of formula Da:

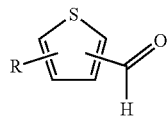
(Da)

In a variant of the aldehyde of formula A', X represents S. The aldehyde used is of formula D'a:

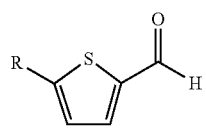
(D'a)

R preferably represents —CHO in the variant of the aldehyde of formula D'a and is then 2,5-thiophenedicarboxaldehyde.

In another variant of the aldehyde of formula A, X represents SR2 with R2 representing a radical selected from the group consisting of alkyl, aryl, arylalkyl, alkylaryl and cycloalkyl radicals. The aldehyde used is of formula Db:

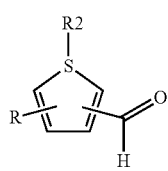
(Db)

In yet another variant of the aldehyde of formula A, X represents R3-S—R2 with R2 and R3 representing, each independently of one another, a radical selected from the group consisting of alkyl, aryl, arylalkyl, alkylaryl and cycloalkyl radicals. The aldehyde used is of formula Dc:

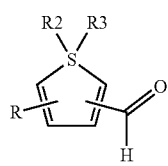
(Dc)

In yet another variant of the aldehyde of formula A, X represents S=O. The aldehyde used is of formula Dd:

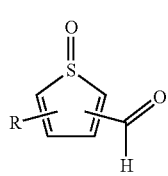
(Dd)

In yet another variant of the aldehyde of formula A, X represents O=S=O. The aldehyde used is of formula De:

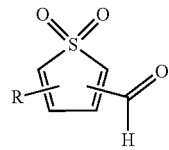
(De)

Among the different embodiments described above, preference will be given to the embodiments and variants in which X represents NH, S or O. In these embodiments and variants, it will be possible, in accordance with the invention, to have R representing —H or —CHO and preferably R representing —CHO. In these embodiments and variants, R will preferentially be in the 5 position and the —CHO group will preferentially be in the 2 position on the aromatic ring (formula A').

Thus, more preferentially, the aromatic aldehyde is selected from the group consisting of 1,4-benzenedicarboxaldehyde, furfuraldehyde, 2,5-furandicarboxaldehyde and the mixtures of these compounds.

The rubber composition is preferably devoid of formaldehyde.

When the phenol-aldehyde resin is based on several aldehydes, at least one of which is an aldehyde of formula W as described above, each aldehyde other than each aldehyde of formula W as described above is preferentially different from formaldehyde. The composition is then also preferentially devoid of formaldehyde.

In other words and preferably, the or each aldehyde of the phenol-aldehyde resin is different from formaldehyde.

"Devoid of formaldehyde" is intended to mean that the content by weight of formaldehyde, by total weight of the aldehyde or aldehydes, is strictly less than 1%.

In some embodiments, the composition can comprise formaldehyde. Preferably, the composition then comprises a content by weight of formaldehyde, by total weight of the aldehyde or aldehydes, of less than or equal to 10%, preferably to 5% and more preferentially to 2%.

Method for Manufacturing the Aldehyde W3

The method for manufacturing the aldehyde of formula W3:

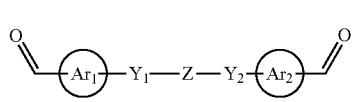
(W3)

in which the $Ar_1$ and $Ar_2$ rings are identical, $Y_1$ and $Y_2$ each represent oxygen, comprises a step during which the following are reacted:
  a reactant of formula OHa—Z—OHa in which Ha represents a halogen, and
  a reactant of formula

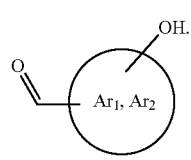

Method for Manufacturing the Aldehyde W1

The method for manufacturing the aldehyde of formula W1:

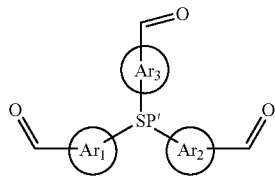
(W1)

in which the $Ar_1$, $Ar_2$ and $Ar_3$ rings are identical, SP' representing the

group with $Y_1$, $Y_2$, $Y_3$, representing oxygen and directly connecting Z and $Ar_1$, $Ar_2$ and $Ar_3$ respectively, comprises a step during which the following are reacted:

a reactant of formula

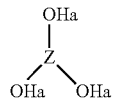

in which Ha represents a halogen, and
a reactant of formula

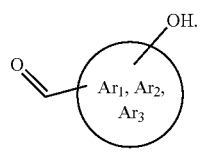

Method for Manufacturing the Aldehyde W2

The method for manufacturing the aldehyde of formula W2:

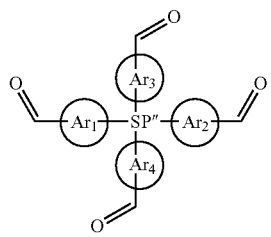
(W2)

in which the $Ar_1$, $Ar_2$, $Ar_3$ and $Ar_4$ rings are identical, SP''' representing the

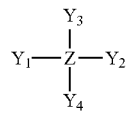

group with $Y_1$, $Y_2$, $Y_3$, $Y_4$ representing oxygen and directly connecting Z and $Ar_1$, $Ar_2$, $Ar_3$ and $Ar_4$ respectively, comprises a step during which the following are reacted:

a reactant of formula

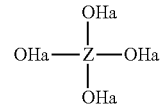

in which Ha represents a halogen, and
a reactant of formula

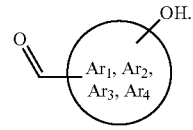

Method for Manufacturing the Aldehyde of Formula W4 According to the Invention

The method for manufacturing the aldehyde of formula W4:

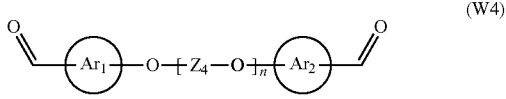
(W4)

in which n is greater than or equal to 1 and preferably greater than or equal to 2, and in which the $Ar_1$, $Ar_2$ rings are identical, comprises a step C during which the following are reacted:

a reactant of formula Ha-$[Z_4—O]_{n-1}$—$Z_4$-Ha in which Ha represents a halogen, and
a reactant of formula

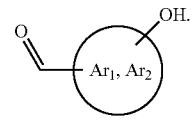

In one embodiment, in a step B prior to step C, the following are reacted:

a reactant of formula LG-$[Z_4—O]_{n-1}$—$Z_4$-LG, in which LG represents a group of formula V—$SO_3$— in which V represents a hydrocarbon-based monovalent radical or a substituted hydrocarbon-based monovalent radical, and
a nucleophilic halide.

A nucleophilic halide may for example be a lithium halide or else a hydrogen halide.

In one embodiment, in a step A prior to step B, the following are reacted:

a reactant of formula OH—[$Z_4$—O]$_{n-1}$—$Z_4$—OH, and a reactant of formula V—$SO_2$—Hb in which V represents a hydrocarbon-based monovalent radical or a substituted hydrocarbon-based monovalent radical, and Hb represents a halogen.

Advantageously, V represents a monovalent radical selected from the group consisting of alkyl, aryl, arylalkyl, alkylaryl, cycloalkyl and alkenyl radicals, preferably V represents an alkyl monovalent radical and more preferentially methyl.

Method for Manufacturing the Aldehyde of Formula W5 According to the Invention

The method for manufacturing the aldehyde of formula W5:

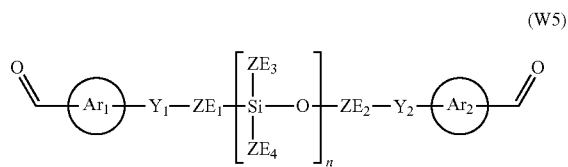
(W5)

in which n is greater than or equal to 1 and preferably greater than or equal to 2, and in which the $Ar_1$, $Ar_2$ rings are identical and $Y_1$, $Y_2$ each representing oxygen, comprises a step C during which the following are reacted:

a reactant of formula Ha-$ZE_1$-[Si($ZE_3ZE_4$)-O]$_n$-$ZE_2$-Ha in which Ha represents a halogen, and a reactant of formula

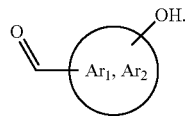

In one embodiment, in a step B prior to step C, the following are reacted:

a reactant of formula LG-$ZE_1$-[Si($ZE_3ZE_4$)-O]$_n$-$ZE_2$-LG, in which LG represents a group of formula V—$SO_3$— in which V represents a hydrocarbon-based monovalent radical or a substituted hydrocarbon-based monovalent radical, and a nucleophilic halide.

A nucleophilic halide may for example be a lithium halide or else a hydrogen halide.

In one embodiment, in a step A prior to step B, the following are reacted:

a reactant of formula HO-$ZE_1$-[Si($ZE_3ZE_4$)-O]$_n$—$ZE_2$-OH, and a reactant of formula V—$SO_2$-Hb in which V represents a hydrocarbon-based monovalent radical or a substituted hydrocarbon-based monovalent radical, and Hb represents a halogen.

Advantageously, V represents a monovalent radical selected from the group consisting of alkyl, aryl, arylalkyl, alkylaryl, cycloalkyl and alkenyl radicals, preferably V represents an alkyl monovalent radical and more preferentially methyl.

Aromatic Polyphenol of the Rubber Composition

In accordance with the invention, the aromatic polyphenol may be, in one embodiment, a simple molecule comprising one or more aromatic rings, at least one of these aromatic rings, or even each aromatic ring, bearing at least two hydroxyl functions in the meta position relative to one another, the two positions ortho to at least one of the hydroxyl functions being unsubstituted. Such a simple molecule does not comprise a repeat unit.

In accordance with the invention, the aromatic polyphenol may be, in another embodiment, a pre-condensed resin based:

on at least one aromatic polyphenol comprising at least one aromatic ring bearing at least two hydroxyl functions in the meta position relative to one another, the two positions ortho to at least one of the hydroxyl functions being unsubstituted; and on at least one compound comprising an aldehyde function, for example an aromatic aldehyde bearing at least one aldehyde function, comprising at least one aromatic ring but alternatively a non-aromatic aldehyde, for example formaldehyde.

Such a pre-condensed resin based on aromatic polyphenol is in accordance with the invention and comprises, unlike the simple molecule described above, a repeat unit. In this instance, the repeat unit comprises at least one aromatic ring bearing at least two hydroxyl functions in the meta position relative to one another.

In another embodiment, the aromatic polyphenol is a mixture of an aromatic polyphenol that forms a simple molecule and of a pre-condensed resin based on aromatic polyphenol.

In the particular embodiments that follow, the aromatic ring or rings of the aromatic polyphenol are described. For the sake of clarity, the "aromatic polyphenol" is described therein in its simple molecule form. This aromatic polyphenol will then be able to be condensed and will in part define the repeat unit. The characteristics of the pre-condensed resin are described in greater detail below.

In a preferred embodiment, the aromatic ring of the aromatic polyphenol bears three —O—H groups in the meta position relative to one another.

The two positions ortho to each —O—H group of the aromatic polyphenol are preferably unsubstituted. This is intended to mean that the two carbon atoms located on either side of (in the position ortho to) the carbon atom bearing the —O—H group just bear a hydrogen atom.

Even more preferentially, the remainder of the aromatic ring of the aromatic polyphenol is unsubstituted. This is intended to mean that the other carbon atoms of the remainder of the aromatic ring (those other than the carbon atoms bearing the —O—H groups) just bear a hydrogen atom.

In one embodiment, the aromatic polyphenol comprises several aromatic rings, at least two of these each bearing at least two —O—H groups in the meta position relative to one another, the two positions ortho to at least one of the —O—H groups of at least one aromatic ring being unsubstituted.

In a preferred embodiment, at least one of the aromatic rings of the aromatic polyphenol bears three —O—H groups in the meta position relative to one another.

The two positions ortho to each —O—H group of at least one aromatic ring are preferably unsubstituted.

Even more preferentially, the two positions ortho to each —O—H group of each aromatic ring are unsubstituted.

Advantageously, the, or each, aromatic ring of the aromatic polyphenol is a benzene ring.

Mention may in particular be made, as example of aromatic polyphenol comprising just one aromatic ring, of resorcinol and phloroglucinol, of respective formulae I and II:

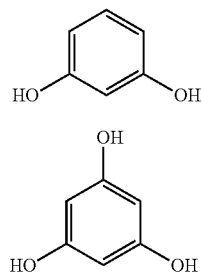 (I)

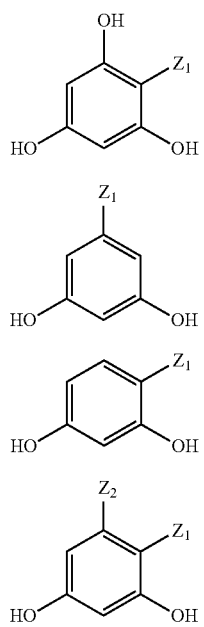 (II), (III-a), (III-b), (III-c), (III-d)

By way of examples, in the case in which the aromatic polyphenol comprises several aromatic rings, at least two of these aromatic rings, which are identical or different, are selected from those of general formulae:

in which the $Z_1$ and $Z_2$ symbols, which are identical or different, if there are several of them on the same aromatic ring, represent an atom (for example, carbon, sulfur or oxygen) or a connecting group, by definition at least divalent, which connects at least these two aromatic rings to the remainder of the aromatic polyphenol.

Another example of aromatic polyphenol is 2,2',4,4'-tetrahydroxydiphenyl sulfide having the following formula:

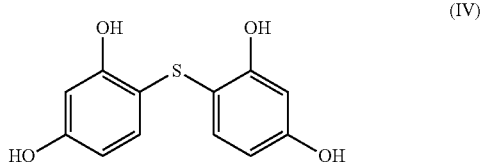 [SMILES: Oc1ccc(Sc2ccc(O)cc2O)c(O)c1] (IV)

Another example of aromatic polyphenol is 2,2',4,4'-tetrahydroxydiphenyl benzophenone of the following formula:

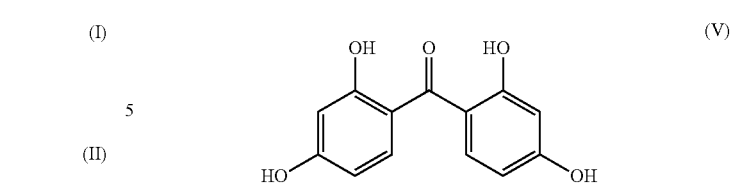 (V)

It is noted that each compound IV and V is an aromatic polyphenol comprising two aromatic rings (of formulae III-c), each of which bears at least two (in this instance two) —O—H groups in the meta position relative to one another.

It is noted, in the case of an aromatic polyphenol comprising at least one aromatic ring in accordance with formula III-b, that the two positions ortho to each —O—H group of at least one aromatic ring are unsubstituted. In the case of an aromatic polyphenol comprising several aromatic rings in accordance with formula III-b, the two positions ortho to each —O—H group of each aromatic ring are unsubstituted.

According to one embodiment of the invention, the aromatic polyphenol is selected from the group consisting of resorcinol I, phloroglucinol II, 2,2',4,4'-tetrahydroxydiphenyl sulfide IV, 2,2',4,4'-tetrahydroxybenzophenone V and the mixtures of these compounds. In a particularly advantageous embodiment, the aromatic polyphenol is phloroglucinol II.

In one embodiment, the aromatic polyphenol comprises a pre-condensed resin based on the aromatic polyphenol as described in any one of these embodiments.

This pre-condensed resin is advantageously based:
on at least one aromatic polyphenol as defined above, and preferentially selected from the group consisting of resorcinol I, phloroglucinol II, 2,2',4,4'-tetrahydroxydiphenyl sulfide IV, 2,2',4,4'-tetrahydroxybenzophenone V, and the mixtures thereof; and
on at least one compound comprising an aldehyde function, and preferably an aromatic aldehyde bearing at least one aldehyde function, comprising at least one aromatic ring.

Advantageously, the compound comprising an aldehyde function is selected from the group consisting of the aldehyde of formula W, the aldehyde of formula W1, the aldehyde of formula W2, formaldehyde, benzaldehyde, furfuraldehyde, 2,5-furandicarboxaldehyde, 1,4-benzenedicarboxaldehyde, 1,3-benzenedicarboxaldehyde, 1,2-benzenedicarboxaldehyde and the mixtures of these compounds. More advantageously, the compound comprising an aldehyde function is selected from the group consisting of formaldehyde, benzaldehyde, furfuraldehyde, 2,5-furandicarboxaldehyde, 1,4-benzenedicarboxaldehyde, 1,3-benzenedicarboxaldehyde, 1,2-benzenedicarboxaldehyde and the mixtures of these compounds. Very advantageously, the compound comprising an aldehyde function is selected to from the group consisting of furfuraldehyde, 2,5-furandicarboxaldehyde, 1,4-benzenedicarboxaldehyde, 1,3-benzenedicarboxaldehyde, 1,2-benzenedicarboxaldehyde and the mixtures of these compounds.

Thus, in the pre-condensed resin based on aromatic polyphenol, the repeat unit corresponds to the characteristics of the aromatic polyphenol defined above except that at least one of the carbon atoms of the aromatic ring, which was unsubstituted, is connected to another unit.

Irrespective of the compound other than the aromatic polyphenol at the heart of the pre-condensed resin, this pre-condensed resin is devoid of free formaldehyde. Specifically, even in the case where the pre-condensed resin is based on an aromatic polyphenol as described previously and on formaldehyde, since the formaldehyde has already reacted with the aromatic polyphenol, the pre-condensed resin is devoid of free formaldehyde liable to be able to react with the aromatic polyphenol in accordance with the invention in a subsequent step.

The aromatic polyphenol may also comprise a mixture of a free aromatic polyphenol molecule and of a pre-condensed resin based on aromatic polyphenol, as described above. In particular, the aromatic polyphenol may also comprise a mixture of phloroglucinol and of a pre-condensed resin based on phloroglucinol.

Rubber Compositions According to the Invention

Depending on the use of the composition, a total amount of aldehyde (aldehyde of formula W and optionally additional aldehyde) ranging from 0.1 to 25 phr will be used. Likewise, an amount of aromatic polyphenol ranging from 0.1 to 25 phr will be used.

In certain embodiments, the [aldehyde]:[aromatic polyphenol] molar ratio advantageously varies from 1:10 to 5:10.

Depending on the use that is made of the composition, the rubber composition has, in the cured state, a secant modulus at 10% elongation, MA10, measured according to standard ASTM D 412, 1998 (test specimen C) of greater than or equal to 10 MPa, preferably greater than or equal to 20 MPa, preferentially greater than or equal to 30 MPa, more preferentially greater than or equal to 40 MPa and even more preferentially greater than or equal to 60 MPa.

The rubber composition preferably comprises a diene elastomer.

An elastomer or rubber (the two terms being synonymous) of the "diene" type is intended to mean, generally, an elastomer resulting at least in part (i.e., a homopolymer or a copolymer) from diene monomers (monomers bearing two conjugated or unconjugated carbon-carbon double bonds).

Particularly preferentially, the diene elastomer of the rubber composition is selected to from the group consisting of polybutadienes (BRs), synthetic polyisoprenes (IRs), natural rubber (NR), butadiene copolymers, isoprene copolymers and the mixtures of these elastomers. Such copolymers are more preferentially selected from the group consisting of butadiene/styrene copolymers (SBRs), isoprene/butadiene copolymers (BIRs), isoprene/styrene copolymers (SIRs), isoprene/butadiene/styrene copolymers (SBIRs) and the mixtures of such copolymers.

The rubber compositions may contain just one diene elastomer or a mixture of several diene elastomers, it being possible for the diene elastomer or elastomers to be used in combination with any type of synthetic elastomer other than a diene elastomer, or even with polymers other than elastomers, for example thermoplastic polymers.

The rubber composition preferably comprises a reinforcing filler.

When a reinforcing filler is used, use may be made of any type of reinforcing filler known for its abilities to reinforce a rubber composition which can be used for the manufacture of tyres, for example an organic filler, such as carbon black, a reinforcing inorganic filler, such as silica, or else a blend of these two types of filler, especially a blend of carbon black and silica.

All the carbon blacks conventionally used in tyres ("tyre-grade" blacks) are suitable as carbon blacks. Mention will more particularly be made, for example, of the reinforcing carbon blacks of the 100, 200 or 300 series (ASTM grades).

In the case of the use of carbon blacks with an isoprene elastomer, the carbon blacks might, for example, be already incorporated in the isoprene elastomer in the form of a masterbatch (see, for example, applications WO 97/36724 or WO 99/16600).

Mention may be made, as examples of organic fillers other than carbon blacks, of functionalized polyvinylaromatic organic fillers, such as described in applications WO-A-2006/069792 and WO-A-2006/069793.

"Reinforcing inorganic filler" should be understood, in the present application, by definition, as meaning any inorganic or mineral filler, regardless of its colour and its origin (natural or synthetic), also referred to as "white filler", "clear filler" or even "non-black filler", in contrast to carbon black, capable of reinforcing by itself alone, without means other than an intermediate coupling agent, a rubber composition intended for the manufacture of tyres, in other words capable of replacing, in its reinforcing role, a conventional tyre-grade carbon black. Such a filler is generally characterized, in a known way, by the presence of hydroxyl (—OH) groups at its surface.

The physical state in which the reinforcing inorganic filler is provided is not important, whether it is in the form of a powder, of micropearls, of granules, of beads or any other appropriate densified form. Of course, reinforcing inorganic filler is also understood to mean mixtures of different reinforcing inorganic fillers, in particular of highly dispersible siliceous and/or aluminous fillers, such as described below.

Mineral fillers of the siliceous type, in particular silica ($SiO_2$), or of the aluminous type, in particular alumina ($Al_2O_3$), are especially suitable as reinforcing inorganic fillers. The silica used may be any reinforcing silica known to those skilled in the art, especially any precipitated or fumed silica having a BET surface area and a CTAB specific surface area both of less than 450 $m^2/g$, preferably from 30 to 400 $m^2/g$. Mention will be made, as highly dispersible precipitated silicas ("HDSs"), for example, of the Ultrasil 7000 and Ultrasil 7005 silicas from Evonik, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface area as described in application WO 03/16837.

Finally, those skilled in the art will understand that, as filler equivalent to the reinforcing inorganic filler described in the present section, use might be made of a reinforcing filler of another, especially organic, nature, provided that this reinforcing filler is covered with an inorganic layer, such as silica, or else comprises functional sites, especially hydroxyl sites, at its surface which require the use of a coupling agent in order to establish the bond between the filler and the elastomer.

The content of total reinforcing filler (carbon black and/or reinforcing inorganic filler, such as silica) is preferably within a range extending from 5 to 120 phr, more preferentially from 5 to 100 phr and even more preferentially from 5 to 90 phr.

The carbon black can advantageously constitute the sole reinforcing filler or the predominant reinforcing filler. Of course, it is possible to use just one carbon black or a blend of several carbon blacks of different ASTM grades. The carbon black can also be used as a blend with other reinforcing fillers and in particular reinforcing inorganic fillers as described above, and in particular silica.

When an inorganic filler (for example silica) is used in the rubber composition, alone or as a blend with carbon black, its content is within a range from 0 to 70 phr, preferentially from 0 to 50 phr, in particular also from 5 to 70 phr, and even more preferentially this proportion varies from 5 to 50 phr, particularly from 5 to 40 phr.

The rubber composition preferably comprises various additives.

The rubber compositions may also comprise all or some of the standard additives customarily used in the elastomer compositions intended for the manufacture of tyres, such as for example plasticizers or extending oils, whether the latter are aromatic or non-aromatic in nature, pigments, protective agents, such as antiozone waxes, chemical antiozonants, antioxidants, antifatigue agents or else adhesion promoters.

The rubber composition preferably comprises a crosslinking system, more preferentially a vulcanization system.

The vulcanization system comprises a sulfur-donating agent, for example sulfur.

The vulcanization system preferably comprises vulcanization activators, such as zinc oxide and stearic acid.

The vulcanization system preferably comprises a vulcanization accelerator and/or a vulcanization retarder.

The sulfur or sulfur-donating agent is used at a preferential content within a range from 0.5 to 10 phr, more preferentially within a range from 0.5 to 8.0 phr. The combined vulcanization accelerators, retarders and activators are used at a preferential content within a range from 0.5 to 15 phr. The vulcanization activator or activators is or are used at a preferential content within a range from 0.5 to 12 phr.

The crosslinking system proper is preferably based on sulfur and on a primary vulcanization accelerator, in particular on an accelerator of the sulfenamide type. Additional to this vulcanization system are various known secondary vulcanization accelerators or vulcanization activators, such as zinc oxide, stearic acid, guanidine derivatives (in particular diphenylguanidine), etc.

Use may be made, as (primary or secondary) accelerator, of any compound capable of acting as accelerator of the vulcanization of diene elastomers in the presence of sulfur, especially accelerators of the thiazole type and their derivatives and accelerators of the thiuram and zinc dithiocarbamate types. These accelerators are more preferentially selected from the group consisting of 2-mercaptobenzothiazole disulfide (abbreviated to "MBTS"), N-cyclohexyl-2-benzothiazolesulfenamide (abbreviated to "CBS"), N,N-dicyclohexyl-2-benzothiazolesulfenamide (abbreviated to "DCBS"), N-(tert-butyl)-2-benzothiazolesulfenamide (abbreviated to "TBBS"), N-(tert-butyl)-2-benzothiazolesulfenimide (abbreviated to "TBSI"), zinc dibenzyldithiocarbamate (abbreviated to "ZBEC") and the mixtures of these compounds. Preferably, use is made of a primary accelerator of the sulfenamide type.

In one embodiment, the rubber composition is in the cured state, i.e. vulcanized. In other embodiments, the composition is in the uncured state, i.e. unvulcanized, the crosslinked phenol-aldehyde resin having been added subsequently to the unvulcanized composition.

In one embodiment, the phenol-aldehyde resin not yet having crosslinked, the rubber composition comprises:
at least one aromatic polyphenol comprising at least one aromatic ring bearing at least two —O—H groups in the meta position relative to one another, the two positions ortho to at least one of the —O—H groups being unsubstituted; and
at least one aldehyde of formula W:

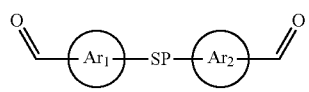

(W)

in which:
each $Ar_1$ and $Ar_2$ group represents, independently of one another, an optionally substituted aromatic ring; and
SP is a connecting group that connects at least the $Ar_1$ and $Ar_2$ groups to one another, SP separating the $Ar_1$ and $Ar_2$ groups by at least 2 covalent bonds.

Similarly with the aldehydes of formula W1, the phenol-aldehyde resin not yet having crosslinked, the rubber composition comprises:
at least one aromatic polyphenol comprising at least one aromatic ring bearing at least two —O—H groups in the meta position relative to one another, the two positions ortho to at least one of the —O—H groups being unsubstituted; and
at least one aldehyde of formula W1:

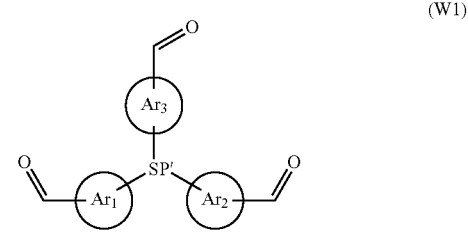

(W1)

in which:
each $Ar_1$, $Ar_2$, $Ar_3$ group represents an optionally substituted aromatic ring;
SP' connects the $Ar_1$, $Ar_2$ and $Ar_3$ groups to one another, SP' separating, in twos, the $Ar_1$, $Ar_2$ and $Ar_3$ groups by at least 2 covalent bonds.

Similarly with the aldehydes of formula W2, the phenol-aldehyde resin not yet having crosslinked, the rubber composition comprises:
at least one aromatic polyphenol comprising at least one aromatic ring bearing at least two —O—H groups in the meta position relative to one another, the two positions ortho to at least one of the —O—H groups being unsubstituted; and
at least one aldehyde of formula W2:

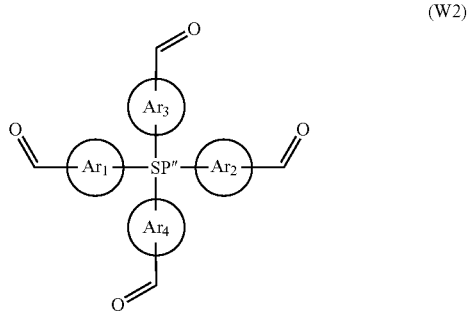

(W2)

in which:
each $Ar_1$, $Ar_2$, $Ar_3$ and $Ar_4$ group represents, independently of one another, an optionally substituted aromatic ring;
SP" connects the $Ar_1$, $Ar_2$, $Ar_3$ and $Ar_4$ groups to one another, SP" separating, in twos, the $Ar_1$, $Ar_2$, $Ar_3$ and $Ar_4$ groups by at least 2 covalent bonds.

Preferably, in this embodiment, the composition is in the uncured state, i.e. unvulcanized.

The rubber composition may preferably be used in the tyre in the form of a layer. Layer is intended to mean any three-dimensional element having any shape and any thickness, especially in the form of a sheet or strip, or other element having any cross section, for example rectangular or triangular.

Of course, all the features relating to the aromatic polyphenol and to the aldehyde of the composition comprising the resin also apply to the composition comprising the aromatic polyphenol and the aldehyde which are not cross-linked in the resin state.

Rubber Composite According to the Invention

The rubber composite is reinforced with at least one reinforcing element embedded in the rubber composition according to the invention.

This rubber composite can be prepared according to a process comprising at least the following steps:
- during a first step, combining at least one reinforcing element with a rubber composition (or elastomer; the two terms are synonymous) to form a rubber composite reinforced with the reinforcing element;
- then, during a second step, crosslinking by curing, for example by vulcanizing, preferably under pressure, the composite formed in this way.

Among reinforcing elements, mention may be made of textile, metallic, or textile-metal hybrid reinforcing elements.

"Textile" is intended to mean, in a manner well known to those skilled in the art, any material made of a substance other than a metallic substance, whether natural or synthetic, which is capable of being transformed into thread or fibre by any appropriate transformation process. Mention may be made, for example, without the examples below being limiting, of a polymer spinning process, such as, for example, melt spinning, solution spinning or gel spinning.

This textile material may consist of a thread or fibre, or also of a fabric produced from threads or fibres, for example a woven fabric with warp threads and weft threads, or else a twill fabric with cross threads.

This textile material of the invention is preferably selected from the group consisting of monofilaments (or individual threads), multifilament fibres, assemblies of such threads or fibres, and mixtures of such materials. It is more particularly a monofilament, a multifilament fibre or a folded yarn.

The term thread or fibre is generally intended to mean any elongate element of great length relative to its cross section, regardless of the shape, for example circular, oblong, rectangular, square, or even flat, of this cross section, it being possible for this thread to be straight or not straight, for example twisted or wavy. The largest dimension of its cross section is preferentially less than 5 mm, more preferentially less than 3 mm.

This thread or fibre may take any known form. For example, it may be an individual monofilament of large diameter (for example and preferably equal to or greater than 50 μm), a multifilament fibre (consisting of a plurality of elementary filaments of small diameter, typically less than 30 μm), a textile folded yarn or cord formed from several textile fibres or monofilaments twisted or cabled together, or else an assembly, group or row of threads or fibres, such as, for example, a band or strip comprising several of these monofilaments, fibres, folded yarns or cords grouped together, for example aligned along a main direction, whether straight or not.

The textile materials may be made of organic, polymeric or inorganic substances.

Mention will be made, as examples of inorganic substances, of glass or carbon.

The invention is preferentially implemented with materials made of polymeric substance, of both the thermoplastic and non-thermoplastic type.

Mention will be made, as examples of polymeric substances of the non-thermoplastic type, for example, of aramid (aromatic polyamide) and cellulose, both natural and artificial, such as cotton, rayon, flax or hemp.

Mention will preferentially be made, as examples of polymeric substances of the thermoplastic type, of aliphatic polyamides and of polyesters. Mention may especially be made, among the aliphatic polyamides, of the polyamides 4-6, 6, 6-6, 11 or 12. Mention may be made, among polyesters, for example, of PET (polyethylene terephthalate), PEN (polyethylene naphthalate), PBT (polybutylene terephthalate), PBN (polybutylene naphthalate), PPT (polypropylene terephthalate), and PPN (polypropylene naphthalate).

By definition, metallic is intended to mean one or more threadlike elements made up predominantly (that is to say more than 50% of its weight) or entirely (100% of its weight) of a metallic material. The metallic material is preferably steel, more preferentially pearlitic (or ferritic-pearlitic) carbon steel advantageously comprising between 0.4% and 1.2% by weight of carbon.

The metallic reinforcing element may be a monofilament, a cord comprising several metallic monofilaments or a multistrand rope comprising several cords, then referred to as strands.

In the preferred case in which the reinforcing element comprises several metallic monofilaments or several strands, the metallic monofilaments or the strands are assembled by twisting or braiding. It is recalled that there are two possible techniques for assembly:
- either by twisting: the metallic monofilaments or the strands undergo both a collective twist and an individual twist about their own axis, thereby generating an untwisting torque on each of the monofilaments or strands;
- or by braiding: the metallic monofilaments or the strands only undergo a collective twist and do not undergo an individual twist about their own axis.

The reinforcing element optionally comprises several monofilaments and is of the rubberized in situ type, that is to say that the reinforcing element is rubberized from the inside, during the actual manufacture thereof, by a filling rubber. Such metallic threadlike elements are known to those skilled in the art. The composition of the filling rubber may be identical, or not identical, to the rubber composition in which the reinforcing element is embedded.

Tyre According to the Invention

Such tyres are, for example, those intended to be fitted onto motor vehicles of the passenger type, SUVs ("Sport Utility Vehicles"), two-wheel vehicles (especially bicycles and motorcycles), aircraft, or industrial vehicles chosen from vans, "heavy-duty" vehicles—that is to say underground trains, buses, heavy road transport vehicles (lorries, tractors, trailers), off-road vehicles, such as agricultural or civil engineering machines and—other transport or handling vehicles.

By way of example, appended FIG. 1 represents highly schematically (without being true to a specific scale) a radial section of a tyre in accordance with the invention for a vehicle of the heavy-duty type.

This tyre 1 comprises a crown 2 reinforced by a crown reinforcement or belt 6, two sidewalls 3 and two beads 4, each of these beads 4 being reinforced with a bead wire 5. The crown 2 is surmounted by a tread, not represented in this diagrammatic figure. A carcass reinforcement 7 is wound around the two bead wires 5 in each bead 4, the turn-up 8 of this reinforcement 7 being, for example, positioned towards the outside of the tyre 1, which is here represented fitted onto its wheel rim 9. The carcass reinforcement 7 is, in a way known per se, composed of at least one ply reinforced by "radial" cords, for example made of metal, that is to say that these cords are positioned virtually parallel to one another and extend from one bead to the other so as to form an angle of between 80° and 90° with the median circumferential plane (plane perpendicular to the axis of rotation of the tyre which is located halfway between the two beads 4 and passes through the middle of the crown reinforcement 6).

This tyre 1 of the invention has, for example, the characteristic that at least a crown reinforcement 6 and/or its carcass reinforcement 7 comprises a rubber composition or a composite according to the invention. Of course, the invention relates to the objects described previously, namely the rubber composite and the tyre, both in the uncured state (before curing or vulcanization) and in the cured state (after curing).

Method for Manufacturing the Composition According to the Invention

The manufacturing method described above and below makes it possible to manufacture the composition according to the invention.

Similarly to the method for manufacturing the composition comprising the aldehyde of formula W, another subject of the invention is a method for manufacturing a rubber composition in the uncured state, the method comprising a step of mixing:
- at least one aromatic polyphenol comprising at least one aromatic ring bearing at least two —O—H groups in the meta position relative to one another, the two positions ortho to at least one of the —O—H groups being unsubstituted; and
- at least one aldehyde of formula W1 and/or W2. Similarly to the method for manufacturing the composition comprising the aldehyde of formula W, one subject of the invention is a method for manufacturing a rubber composition in the cured state, the method comprising:
- a step of manufacturing a rubber composition in the uncured state comprising a step of mixing:
- at least one aromatic polyphenol comprising at least one aromatic ring bearing at least two —O—H groups in the meta position relative to one another, the two positions ortho to at least one of the —O—H groups being unsubstituted; and
- at least one aldehyde of formula W1 and/or W2,
- then, a step of shaping the rubber composition in the uncured state,
- then, a step of vulcanizing the rubber composition during which a phenol-aldehyde resin based on the aromatic polyphenol and on the aldehyde is crosslinked.

The rubber composition may be manufactured in suitable mixers, using two successive preparation phases well known to those skilled in the art:
- a first phase of thermomechanical working or kneading ("non-productive" phase) at high temperature, up to a maximum temperature of between 110° C. and 190° C., preferably between 130° C. and 180° C.,
- followed by a second phase of mechanical working ("productive" phase) down to a lower temperature, typically of less than 110° C., for example between 40° C. and 100° C., during which finishing phase the crosslinking system is incorporated.

In a first embodiment, the method comprises the following steps:
- incorporating, in an elastomer, during a first step, a reinforcing filler, everything being kneaded thermomechanically until a maximum temperature of between 110° C. and 190° C. is reached;
- cooling the combined mixture to a temperature below 110° C.;
- then incorporating, during a second step, a crosslinking system, the aromatic polyphenol and the aldehyde, and optionally the additional aldehyde;
- kneading everything at a temperature below 110° C.

By way of example, the non-productive phase is carried out in a single thermomechanical step during which firstly all the necessary base constituents (diene elastomer, reinforcing filler etc.) are introduced into an appropriate mixer, such as a standard internal mixer, then secondly, for example after kneading for one to two minutes, the other additives, optional additional agents for covering the filler or optional additional processing aids, with the exception of the crosslinking system, the aromatic polyphenol and the aldehyde, and optionally the additional aldehyde, are introduced. The total kneading time, in this non-productive phase, is preferably between 1 and 15 min.

After cooling the mixture thus obtained, the crosslinking system, the aldehyde, and optionally the additional aldehyde, and the aromatic polyphenol are then incorporated in an external mixer, such as an open mill, maintained at a low temperature (for example between 40° C. and 100° C.). The combined mixture is then mixed (productive phase) for a few minutes, for example between 2 and 15 min.

The composition thus obtained in the uncured state can subsequently be shaped, for example calendered, for example in the form of a sheet or of a slab, especially for laboratory characterization, or else extruded, for example in order to form a rubber profiled element used in the manufacture of a tyre.

Then, after an optional step of assembling together several compositions formed as plies or strips in the form of a composite or an uncured tyre blank, a step of vulcanizing the composition, the composite or the blank is carried out during which the phenol-aldehyde resin based on the aromatic polyphenol and on the aldehyde, and optionally on the additional aldehyde, is crosslinked. The vulcanization step is carried out at a temperature greater than or equal to 120° C., preferably greater than or equal to 140° C. The composition is obtained in the cured state.

In a second embodiment, the method comprises the following steps:
- incorporating, in an elastomer, during a first step, a reinforcing filler, the aromatic polyphenol and the aldehyde, and optionally the additional aldehyde, everything being kneaded thermomechanically until a maximum temperature of between 110° C. and 190° C. is reached;
- cooling the combined mixture to a temperature below 110° C.;
- subsequently incorporating, during a second step, a crosslinking system;
- kneading everything at a temperature below 110° C.

Uses According to the Invention

Similarly to the uses of the aldehyde of formula W, independent and separate subjects of the invention are also:

the use of an aldehyde of formula W1 and/or W2 in a rubber composition comprising a phenol-aldehyde resin based on at least one aromatic polyphenol and on at least the aldehyde for increasing the stiffness of the rubber composition, the use of an aldehyde of formula W1 and/or W2 for increasing the fluidity in the uncured state of a rubber composition comprising a phenol-aldehyde resin based on at least one aromatic polyphenol and on at least the aldehyde, the use of an aldehyde of formula W1 and/or W2 for retaining the stiffness with the increase in temperature of a rubber composition comprising a phenol-aldehyde resin based on at least one aromatic polyphenol and on at least the aldehyde.

The invention and its advantages will be easily understood in the light of the exemplary embodiments which follow.

EXEMPLARY EMBODIMENTS OF THE INVENTION AND COMPARATIVE TESTS

These tests demonstrate that:

the stiffness of the rubber composition according to the invention is greatly increased relative to a rubber composition devoid of reinforcing resin;

the stiffness of the rubber composition according to the invention may be improved compared to a rubber composition using a conventional reinforcing resin based on a methylene acceptor with HMT or H3M as methylene donor;

the stiffness retention of the rubber composition according to the invention at high temperatures, in particular for temperatures ranging up to 150° C., is greater, in all the embodiments, than that of the rubber compositions devoid of reinforcing resin;

the fluidity of the composition according to the invention is improved relative to that of a composition comprising an aromatic polyphenol and an aldehyde having a structure not in accordance with the invention;

the phenol-aldehyde resin of the composition using the aldehyde is devoid of formaldehyde and does not generate any formaldehyde during its formation.

For this purpose, several rubber compositions, denoted hereinafter T0, T1 and T2 and I1 to I13 were prepared as indicated above and are summarized in the appended Table 1 below. The compositions T0, T1 and T2 are not in accordance with the invention, unlike compositions I1 to I13 which are in accordance with the invention.

All the compositions T0 to T2 and I1 to I13 have the following shared portion in their formulations (expressed in phr, parts by weight per hundred parts of elastomer): 100 phr of natural rubber, 75 phr of carbon black N326, 1.5 phr of N-(1,3-dimethylbutyl)-N-phenyl-para-phenylenediamine, 1.5 phr of stearic acid, 5 phr of ZnO, 1 phr of N-(tert-butyl)-2-benzothiazolesulfamide and 2.5 phr of insoluble sulfur 20H.

The composition T0 does not comprise any reinforcing resin added to this shared portion.

In addition to the shared portion, the composition T1 comprises a reinforcing resin based on hexamethylenetetramine (1.6 phr) and on a pre-condensed phenolic resin (4 phr). The composition T1 represents a conventional composition of the prior art, having greater stiffness than that of the composition T0.

In addition to the shared portion, the composition T2 comprises a phenol-aldehyde resin based on phloroglucinol and on 1,4-benzenedicarboxaldehyde. The composition T2 comprises 14 phr of phloroglucinol and 4.85 phr of 1,4-benzenedicarboxaldehyde.

In addition to the shared portion, in the uncured state, each rubber composition I1 to I13 according to the invention comprises:

at least one aromatic polyphenol comprising at least one aromatic ring bearing at least two —O—H groups in the meta position relative to one another, the two positions ortho to at least one of the —O—H groups being unsubstituted; and at least one aldehyde of formula W.

In addition to the shared portion, in the cured state, each rubber composition I1 to I13 according to the invention comprises a phenol-aldehyde resin based:

on at least one aromatic polyphenol comprising at least one aromatic ring bearing at least two —O—H groups in the meta position relative to one another, the two positions ortho to at least one of the —O—H groups being unsubstituted; and on at least one aldehyde of formula W.

The aromatic polyphenol of each rubber composition I1 to I13 is selected from the group consisting of resorcinol, phloroglucinol, 2,2',4,4'-tetrahydroxydiphenyl sulfide, 2,2', 4,4'-tetrahydroxybenzophenone and the mixtures of these compounds. Each aromatic polyphenol of each composition I1 to I13 according to the invention comprises a single aromatic ring, here a benzene ring, bearing three, and only three, —O—H groups in the meta position relative to one another for the compositions I1 and I3 to I13 and bearing two, and only two, —O—H groups in the meta position relative to one another for the composition I2. The remainder of the aromatic ring of the aromatic polyphenol is unsubstituted. In particular, the two positions ortho to each —O—H group are unsubstituted. Finally, in addition to the shared portion, each resin of each composition I7 to I9 is, in addition to the aldehyde of formula W, based on an additional, preferentially aromatic, aldehyde selected from the group consisting of 1,3-benzenedicarboxaldehyde, 1,4-benzenedicarboxaldehyde and an aldehyde of formula A:

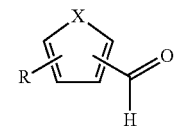

(A)

in which:

X comprises N, S or O,

R represents —H or —CHO, and the mixtures of these compounds.

In this case, the additional aldehyde is selected from the group consisting of 1,4-benzenedicarboxaldehyde, furfuraldehyde, 2,5-furandicarboxaldehyde and the mixtures of these compounds. Here, the additional aldehyde of each composition I7 to I9 according to the invention is 1,4-benzenedicarboxaldehyde.

Each composition according to the invention I1 to I13 comprises the aromatic polyphenol, the aldehyde of formula W and the additional aldehyde for the compositions I7 to I9, in the molar proportions indicated in Table 1 in a column entitled molar ratio.

Aldehydes of formula W of the compositions I1 to I13

Each aldehyde of the compositions I1 to I13 is such that SP separates the $Ar_1$ and $Ar_2$ groups by a number of covalent bonds less than or equal to 150, preferably less than or equal to 100 and more preferentially less than or equal to 75. Each aldehyde of the compositions I1 to I13 is also such that SP separates the $Ar_1$ and $Ar_2$ groups by a number of covalent bonds greater than or equal to 3, preferably greater than or equal to 4 and more preferentially greater than or equal to 5. Depending on the compositions, SP comprises at least 2 successive single bonds, preferably at least 5 successive single bonds. SP represents a divalent radical selected from the group consisting of a hydrocarbon-based radical and a substituted hydrocarbon-based radical. The aldehydes of the compositions I1 to I13 all have a molar mass less than or equal to 10 000 g·mol$^{-1}$, preferably less than or equal to 5000 g·mol$^{-1}$, and more preferentially less than or equal to 2000 g·mol$^{-1}$.

Each aldehyde of the compositions I1 to I13 is such that each $Ar_1$, $Ar_2$ aromatic ring is a benzene ring. With the exception of the aldehyde of formula W of the composition I12, the remainder of each $Ar_1$, $Ar_2$ aromatic ring is unsubstituted.

With the exception of the aldehydes of the compositions I10 and I11, the SP group and the CHO group are located in the para position relative to one another on each $Ar_1$ and $Ar_2$ aromatic ring.

Aldehydes of Formula W of the Compositions I1 to I5 and I10 to I12

Each aldehyde of formula W of each composition I1 to I5 and I10 to I12 is such that the molar mass of the aldehyde of formula W is less than or equal to 500 g·mol$^{-1}$. Furthermore, SP separates the $Ar_1$ and $Ar_2$ groups by a number of covalent bonds less than or equal to 20, preferably less than or equal to 15.

Each aldehyde of formula W of each composition I1 to I5 and I10 to I12 is of formula W3 in which $Y_1$—Z—$Y_2$ represents a divalent radical with $Y_1$ and $Y_2$ each representing, independently of one another, a group selected from the group consisting of oxygen, a $CH_2$ group, a C=O group, an S=O group and an $SO_2$ group, preferably from the group consisting of oxygen, a C=O group, an S=O group and an $SO_2$ group, and more preferentially $Y_1$ and $Y_2$ each representing oxygen. Z represents a divalent radical selected from the group consisting of a hydrocarbon-based radical and a substituted hydrocarbon-based radical.

In this instance, Z represents a divalent radical selected from the group consisting of the following radicals: alkylene (compositions I1 to I4 and I10 to I12), arylene, arylalkylene, alkylarylene, cycloalkylene, alkenylene, AL-AR-AL with AL representing alkyl monovalent radicals and AR representing an aryl group (composition I5), AR-AL-AR with AR representing aryl monovalent radicals and AL representing an alkyl group.

For the compositions I1 to I4 and I10 to I12, Z represents a linear alkylene divalent radical comprising a number of carbon atoms ranging from 1 to 15, preferably from 2 to 12 and more preferentially from 2 to 8. This number of carbon atoms is equal to 6 for the aldehydes of the compositions I1, I2 and I10 to I12. This number of carbon atoms is equal to 2 for the aldehyde of the composition I3. This number of carbon atoms is equal to 12 for the aldehyde of the composition I4.

The aldehyde of formula W of the compositions I1 and I2 has the following formula SP10:

(SP10)

Figure 2A:
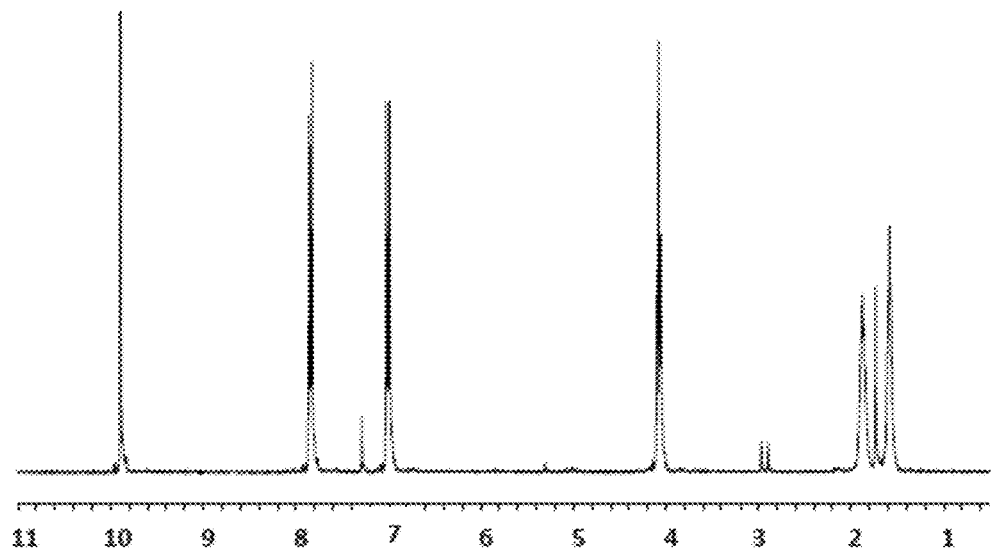
FIG. 2A is the $^1$H NMR spectrum of aldehyde SP10.
Figure 2B:
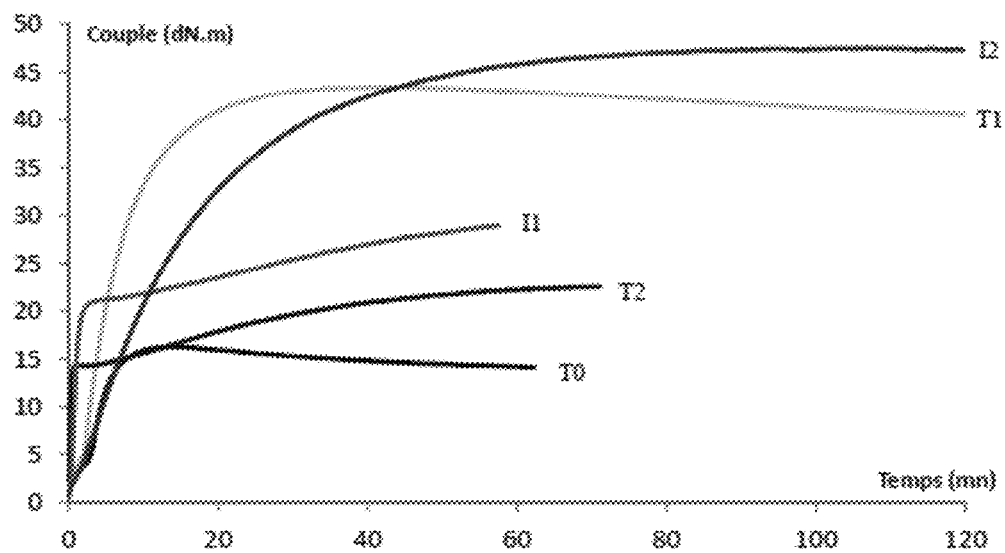
FIG. 2B is a representation of the change in the rheometric torque of related compositions of the present invention.

The aldehyde SP10 is prepared from 1,6-dibromohexane (CAS 629-03-8) and from 4-hydroxybenzaldehyde (CAS 123-08-0) in the presence of a mineral base in an organic solvent. Thus, for example, 30 g of 1,6 dibromohexane, 30 g of 4-hydroxybenzaldehyde and 68 g of $K_2CO_3$ in 300 ml of DMF are introduced. Everything is stirred at 110° C. for 24 hours. Next, the reaction mixture is filtered and 5 aqueous extractions are carried out followed by 2 extractions in the presence of LiBr. The product is then recovered by filtration of the salts and evaporation of the solvents. 33.4 g of the aldehyde SP10 are obtained. The $^1$H NMR spectrum of the aldehyde SP10 is represented in FIG. 2A ($^1$H NMR (CDCl$_3$, 300 MHz): 9.88 (2H, s), 7.82 (4H, d), 7.01 (4H, d), 4.07 (4H, t), 1.87 (4H, m), 1.58 (4H, m)).

The aldehyde of formula W of the composition I3 has the following formula SP11 (CAS 34074-28-7):

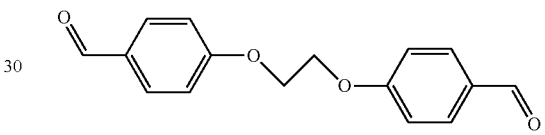

(SP11)

Figure 3A:
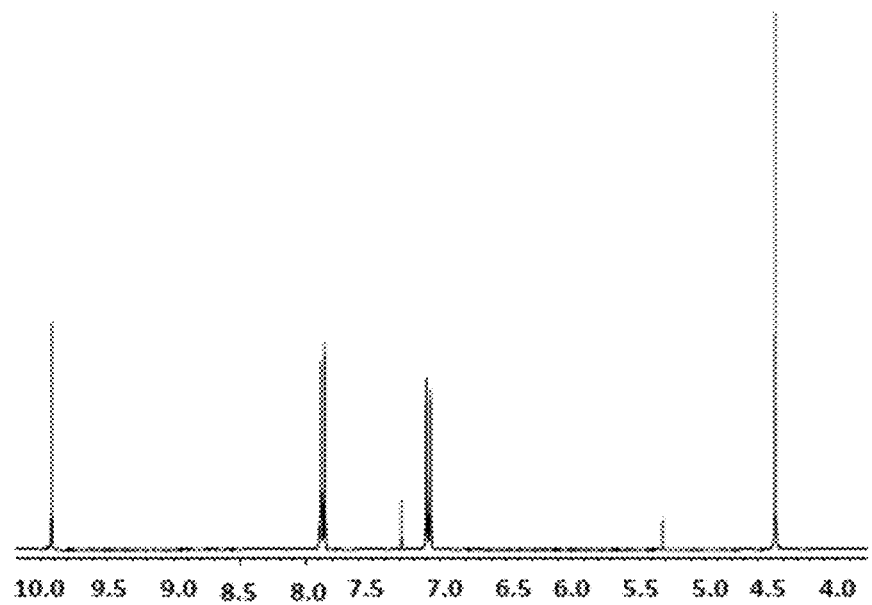
FIG. 3A is the $^1$H NMR spectrum of aldehyde SP11.
Figure 3B:
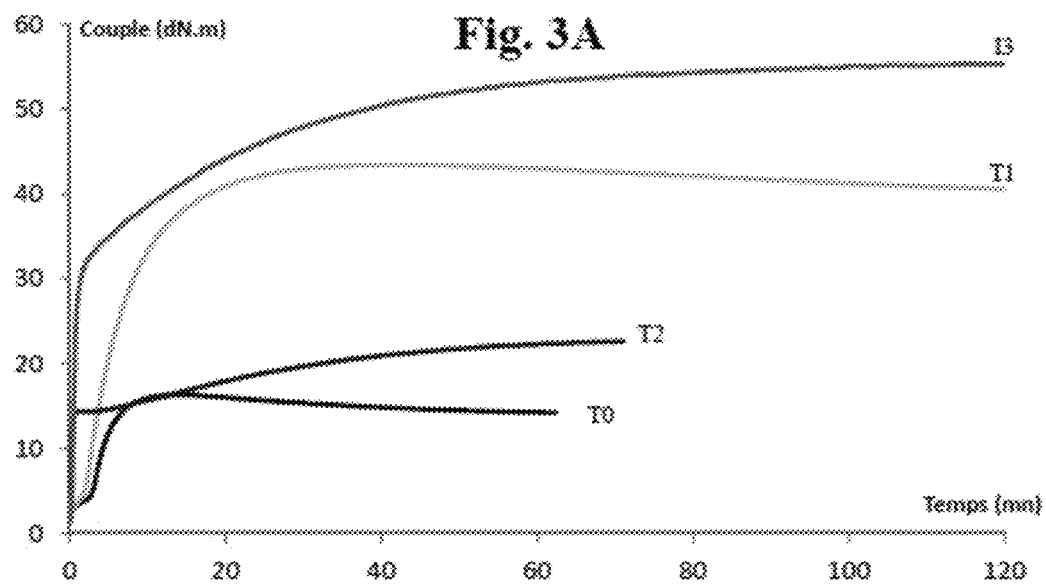
FIG. 3B is a representation of the change in the rheometric torque of related compositions of the present invention.

The aldehyde SP11 is prepared in a similar manner to the aldehyde SP10 from 1,2-dibromoethane (CAS 106-93-4) and from 4-hydroxybenzaldehyde (CAS 123-08-0). The $^1$H NMR spectrum of the aldehyde SP11 is represented in FIG. 3A ($^1$H NMR (CDCl$_3$, 300 MHz): 9.92 (2H, s), 7.86 (4H, m), 7.09 (4H, m), 4.46 (4H, s)).

The aldehyde of formula W of the composition I4 has the following formula SP12 (CAS 69285-82-1):

(SP12)

Figure 4A:
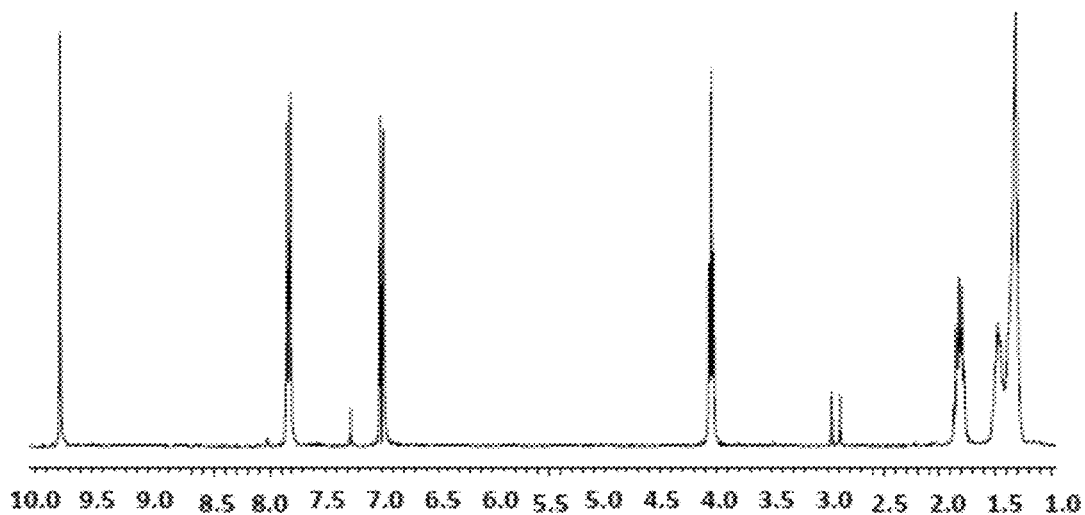
FIG. 4A is the $^1$H NMR spectrum of aldehyde SP12.
Figure 4B:
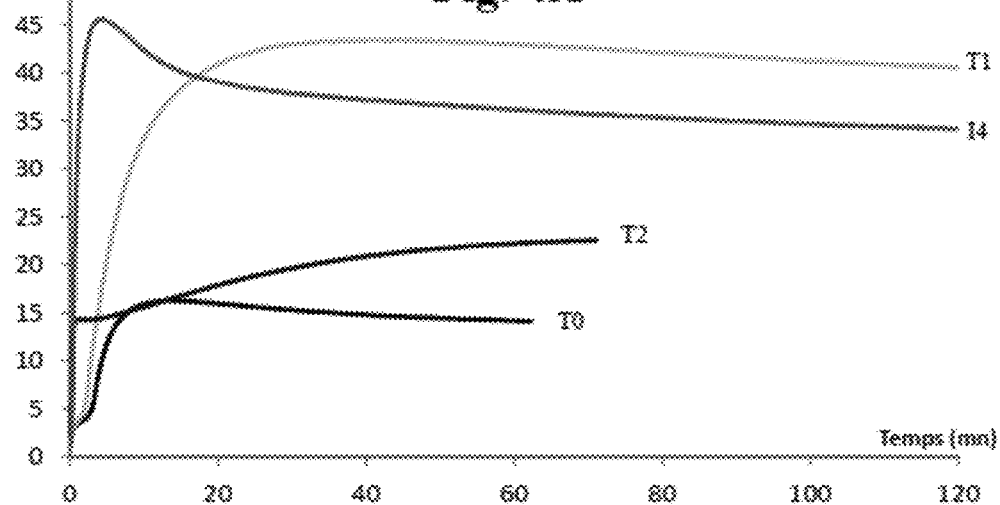
FIG. 4B is a representation of the change in the rheometric torque of related compositions of the present invention.

The aldehyde SP11 is prepared in a similar manner to the aldehyde SP10 from 1,10-dibromodecane (CAS 4101-68-2) and from 4-hydroxybenzaldehyde (CAS 123-08-0). The $^1$H NMR spectrum of the aldehyde SP12 is represented in FIG. 4A ($^1$H NMR (CDCl$_3$, 300 MHz): 9.88 (2H, s), 7.81 (4H, d), 6.98 (4H, d), 4.04 (4H, t), 1.82 (4H, q), 1.31 (16H, m)).

The aldehyde of formula W of the composition I5 has the following formula SP13 (CAS 64621-41-6):

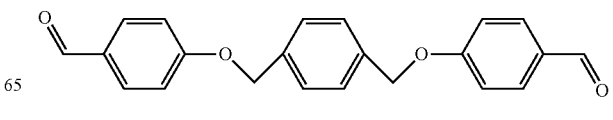

(SP13)

Figures 5A, 5B:
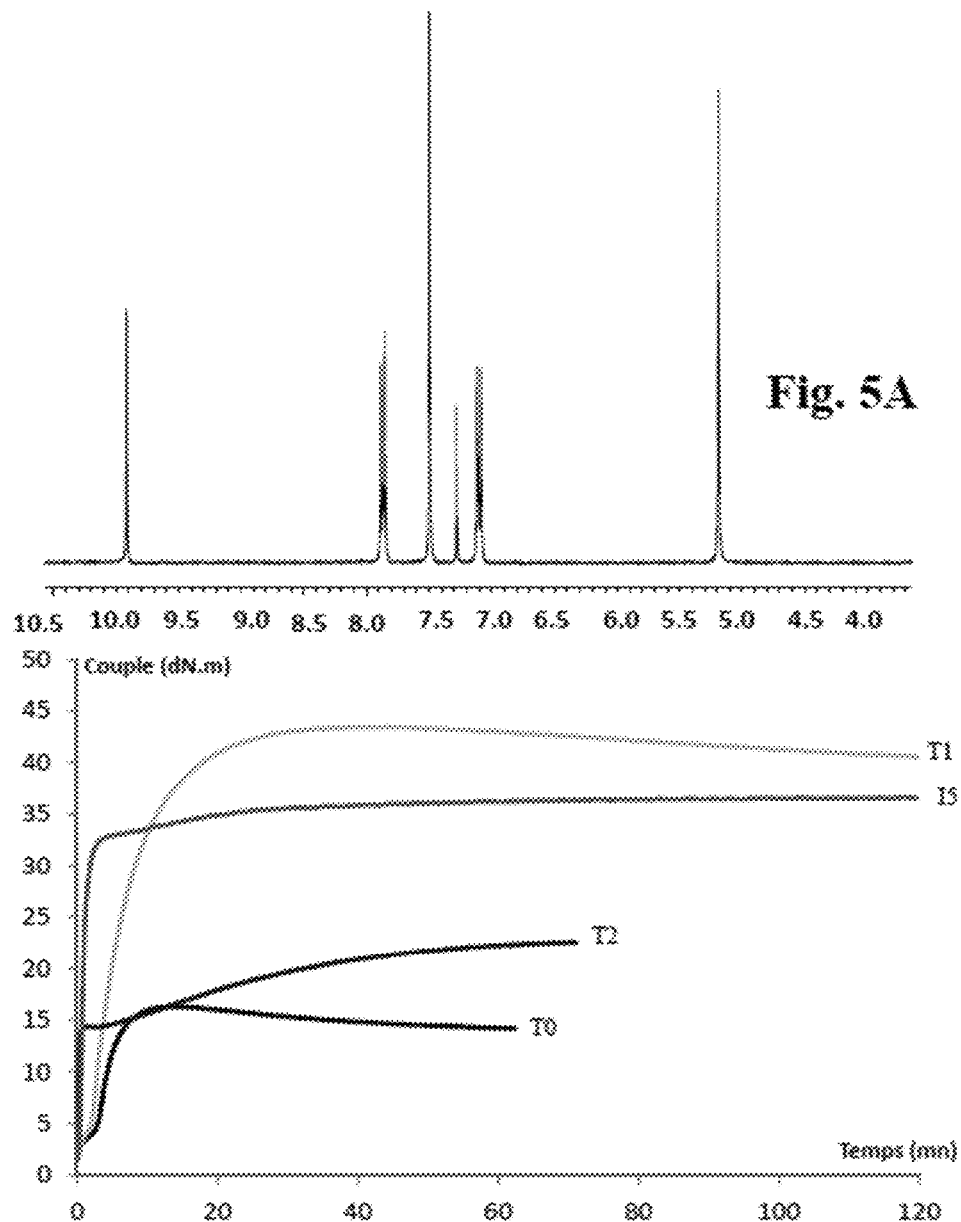
FIG. 5A is the $^1$H NMR spectrum of aldehyde SP13.
FIG. 5B is a representation of the change in the rheometric torque of related compositions of the present invention.

The aldehyde SP13 is prepared in a similar manner to the aldehyde SP10 from 1,4-bis(bromomethyl)benzene (CAS 623-24-5) and from 4-hydroxybenzaldehyde (CAS 123-08-0). The $^1$H NMR spectrum of the aldehyde SP13 is represented in FIG. 5A ($^1$H NMR (CDCl$_3$, 300 MHz): 9.91 (2H, s), 7.88 (4H, d), 7.49 (4H, s), 7.08 (4H, d), 5.19 (4H, s)).

The aldehyde of formula W of the composition I10 has the following formula SP14 (CAS 112116-24-2):

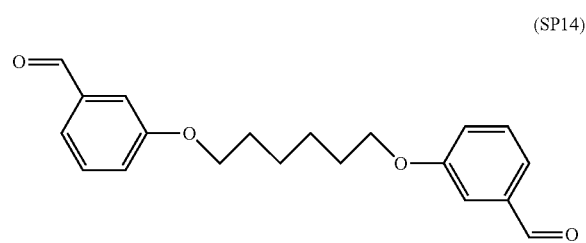 [SMILES: O=Cc1cccc(OCCCCCCOc2cccc(C=O)c2)c1]
(SP14)

The aldehyde of formula SP14 is such that the SP group and the CHO group are located in the meta position relative to one another on each Ar$_1$ and Ar$_2$ aromatic ring.

Figures 6A, 6B:
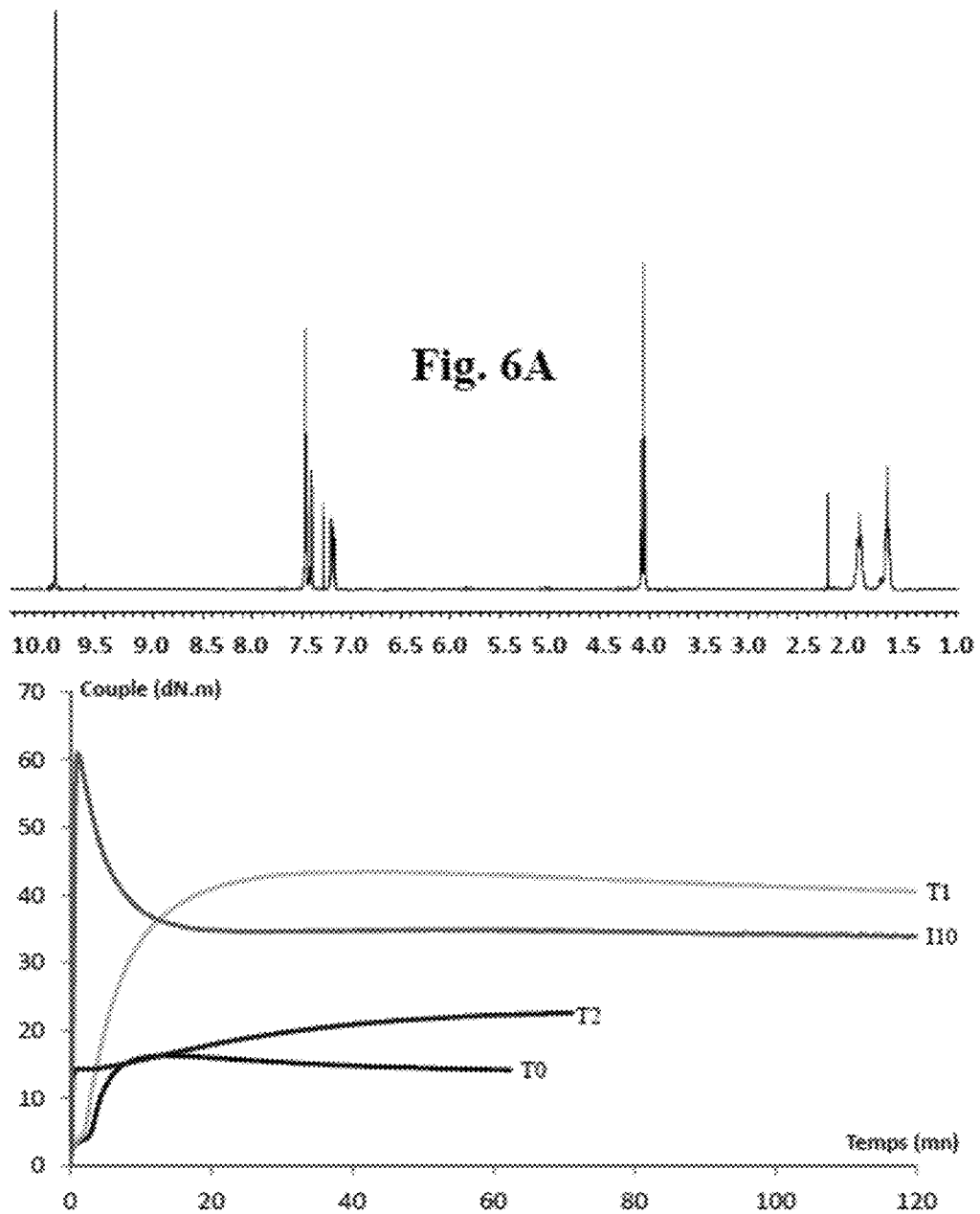
FIG. 6A is the $^1$H NMR spectrum of aldehyde SP14.
FIG. 6B is a representation of the change in the rheometric torque of related compositions of the present invention.

The aldehyde SP14 is prepared in a similar manner to the aldehyde SP10 from 1,6-dibromohexane (CAS 629-03-8) and from 3-hydroxybenzaldehyde (CAS 100-83-4). The $^1$H NMR spectrum of the aldehyde SP14 is represented in FIG. 6A ($^1$H NMR (CDCl$_3$, 300 MHz): 9.98 (2H, s), 7.46 (6H, m), 7.18 (2H, m), 4.05 (4H, t), 1.87 (4H, m), 1.58 (4H, m)).

The aldehyde of formula W of the composition I11 has the following formula SP15 (CAS 64621-35-8):

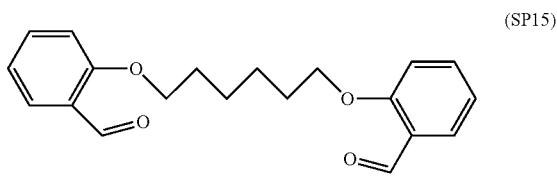 [SMILES: O=Cc1ccccc1OCCCCCCOc1ccccc1C=O]
(SP15)

The aldehyde of formula SP15 is such that the SP group and the CHO group are located in the ortho position relative to one another on each Ar$_1$ and Ar$_2$ aromatic ring.

Figure 7A:
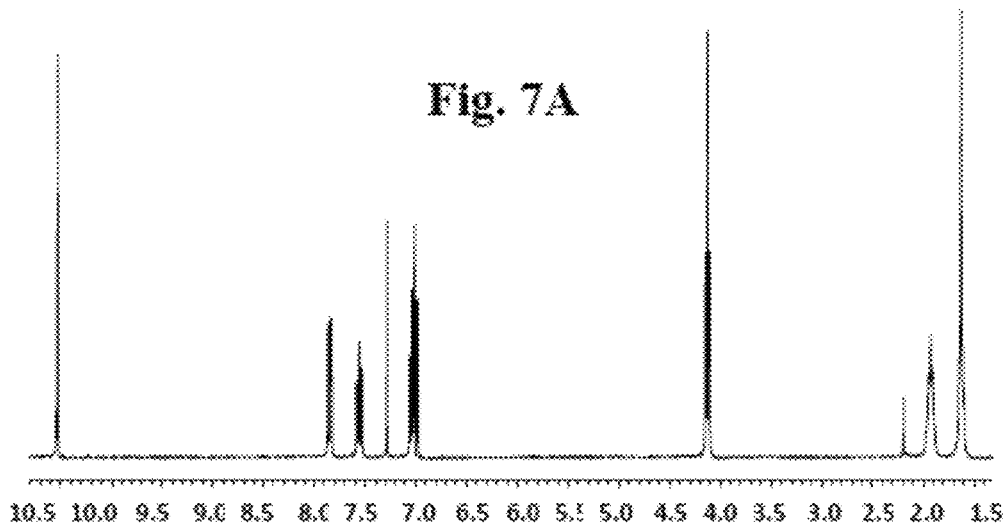
FIG. 7A is the $^1$H NMR spectrum of aldehyde SP15.
Figure 7B:
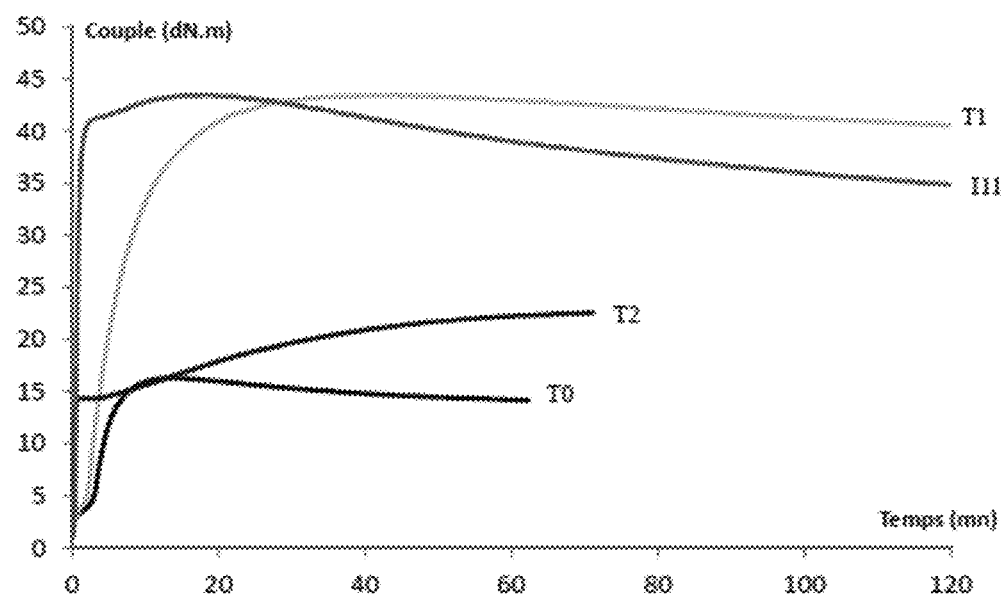
FIG. 7B is a representation of the change in the rheometric torque of related compositions of the present invention.

The aldehyde SP15 is prepared in a similar manner to the aldehyde SP10 from 1,6-dibromohexane (CAS 629-03-8) and from 2-hydroxybenzaldehyde (CAS 90-02-8). The $^1$H NMR spectrum of the aldehyde SP15 is represented in FIG. 7A ($^1$H NMR (CDCl$_3$, 300 MHz): 10.53 (2H, s), 7.83 (2H, m), 7.56 (2H, m), 7.01 (4H, m), 4.12 (4H, t), 1.90 (4H, m), 1.62 (4H, m)).

The aldehyde of formula W of the composition I12 has the following formula SP16 (CAS 79293-43-9):

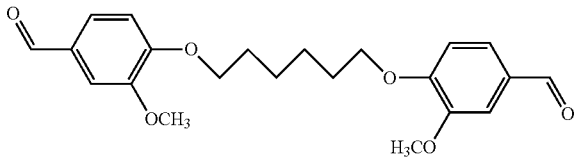
(SP16)

Each Ar$_1$, Ar$_2$ aromatic ring is substituted respectively by at least one K$_1$, K$_2$ group representing, independently of one another, a hydrocarbon-based monovalent radical and a substituted hydrocarbon-based monovalent radical. In this instance, preferably, each K$_1$, K$_2$ group representing, independently of one another, an alkyl monovalent radical or an O-alkyl monovalent radical and here an O-methyl radical. In this instance, each K$_1$, K$_2$ group, here O-methyl and the SP group are located in the ortho position relative to one another on each Ar$_1$, Ar$_2$ benzene aromatic ring.

Figure 8A:
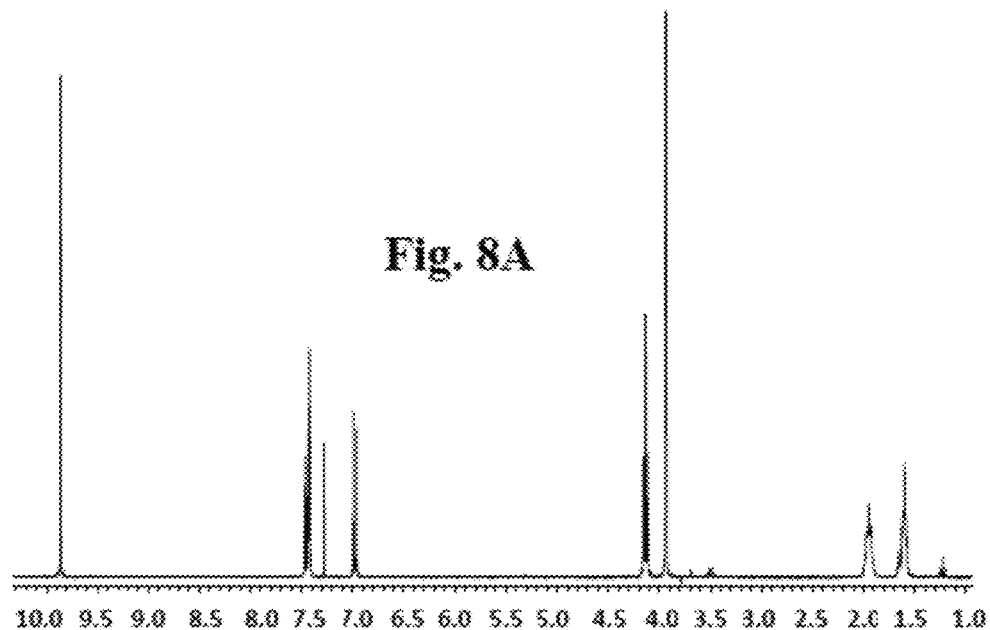
FIG. 8A is the $^1$H NMR spectrum of aldehyde SP16.
Figure 8B:
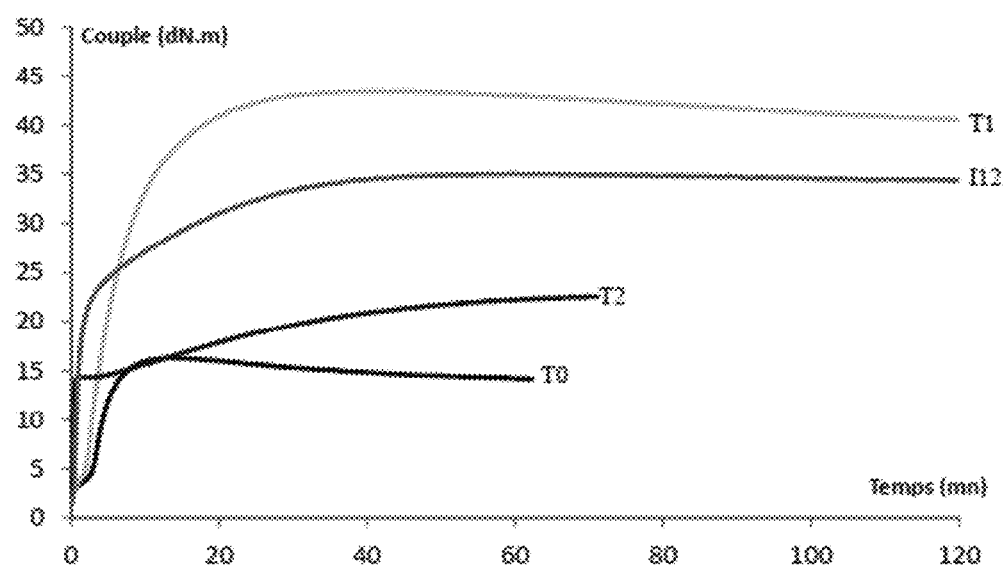
FIG. 8B is a representation of the change in the rheometric torque of related compositions of the present invention.

The aldehyde SP16 is prepared in a similar manner to the aldehyde SP10 from 1,6-dibromohexane (CAS 629-03-8) and from 4-hydroxy-3-methoxybenzaldehyde (CAS 121-33-5). The $^1$H NMR spectrum of the aldehyde SP16 is represented in FIG. 8A ($^1$H NMR (CDCl$_3$, 300 MHz): 9.86 (2H, s), 7.42 (4H, m), 6.96 (2H, d), 4.13 (4H, t), 3.93 (6H, s), 1.94 (4H, m), 1.59 (4H, m)).

Aldehydes of Formula W of the Compositions I6 to I9

Each aldehyde of formula W of each composition I6 to I9 is such that SP separates the Ar$_1$ and Ar$_2$ groups by a number of covalent bonds strictly greater than 15 and SP represents a radical selected from the group consisting of polyester, polyether, polydiene, polyalkylene and polysilicone radicals and the combinations of these radicals, preferably from the group consisting of polyether (compositions I6 to I8) and polysilicone (composition I9) radicals and the combinations of these radicals. Here, the radical is divalent.

The aldehyde of formula W of the compositions I6 and I7 is of formula W4. Z$_4$ is then a linear alkylene divalent radical, in this instance a butylene radical. The aldehyde of formula W of the compositions I6 and I7 has the following formula SP50:

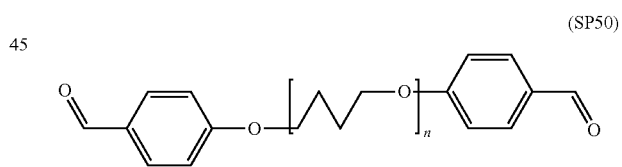
(SP50)

with n between 3 and 4.

The aldehyde SP50 is prepared from poly(tetrahydrofuran) (poly(THF)) according to the following synthetic route:

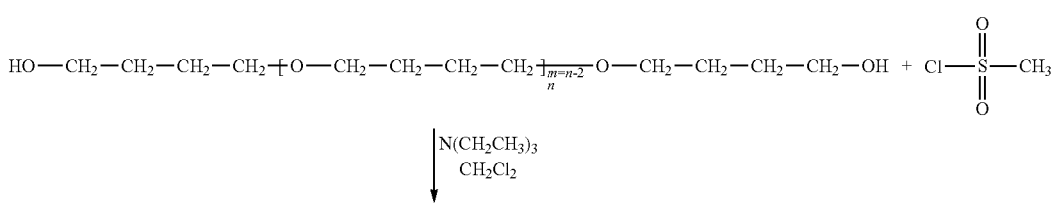

-continued

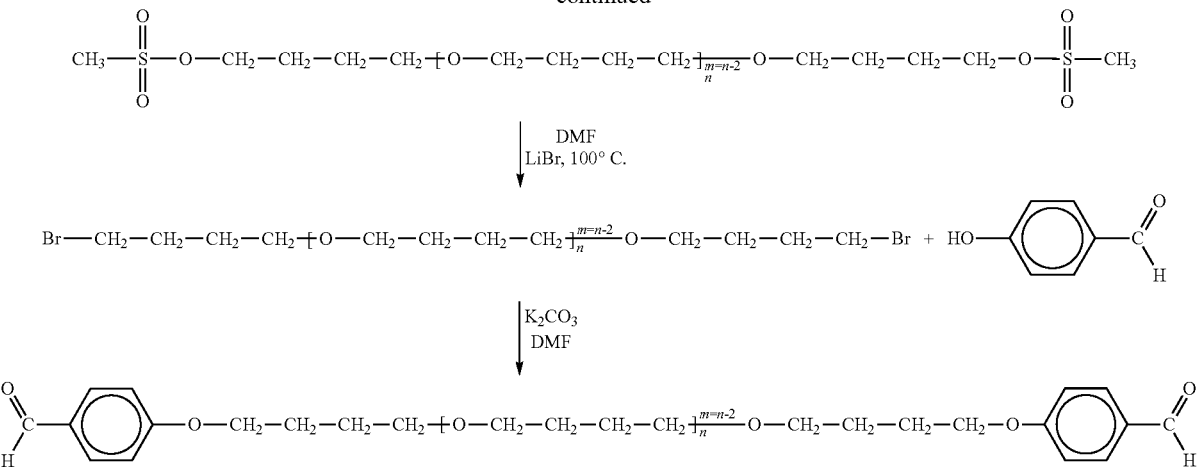

In a first step, a poly(THF) having a molar mass of around 250 g·mol$^{-1}$ (Sigma-Aldrich reference 345261—CAS 25190-06-1) and methanesulfonyl chloride (CAS 124-63-0) are reacted in the presence of an organic base, here triethylamine in an organic solvent, here dichloromethane. Thus, for example, introduced into a two-neck round-bottom flask are 35 g of poly(THF), 46.75 g (3.3 eq) of triethylamine (CAS 121-44-8) in 500 ml of dichloromethane. The reaction medium is cooled (0° C.) and 48.09 g (3 eq) of mesyl chloride (CAS 124-63-0) are then added dropwise. The round-bottom flask is equipped with a condenser, then the mixture is stirred magnetically for 1 hour. Once the synthesis is completed, 500 ml of dichloromethane are added. An acidic (0.5 M HCl) aqueous extraction is carried out in order to eliminate the excess triethylamine, followed by washing with water. Drying over Na$_2$SO$_4$, filtration and evaporation are carried out. A brown liquid is obtained with a yield of 95%.

Next, in a second step, the mesylate groups are substituted by halide groups, here bromides, by reacting the substituted poly(THF) with lithium bromide (CAS 7550-35-8) in an organic solvent. Thus, for example, introduced into a single-neck round-bottom flask are 54.5 g of poly(THF) dimesylate, 36.7 g (4 eq) of LiBr (CAS 7550-35-8) and 500 ml of N,N-dimethylformamide. The round-bottom flask is equipped with a condenser, then the mixture is stirred magnetically at 100° C. for 4 hours. After cooling to ambient temperature, 1000 ml of ethyl acetate are added to the mixture. Five aqueous extractions are then carried out in order to eliminate the LiBr. The organic phase is then dried over anhydrous sodium sulfate, then the ethyl acetate is eliminated by vacuum evaporation. The final product is a brown liquid obtained with a yield of 86%.

Finally, during a third step, the dibromide intermediate product and 4-hydroxybenzaldehyde (CAS 123-08-0) are reacted in the presence of a mineral base in an organic solvent. Thus, for example, introduced into a single-neck round-bottom flask are 42 g of poly(THF) dibromide, 28.04 g (2.05 eq) of 4-hydroxybenzaldehyde, 63.46 g (4 eq) of potassium carbonate and 500 ml of N,N-dimethylformamide. The round-bottom flask is equipped with a condenser, then the mixture is stirred magnetically at 110° C. for 4 hours. After cooling to ambient temperature, 1000 ml of ethyl acetate are added to the mixture. Five aqueous extractions are then carried out in order to eliminate the 4-hydroxybenzaldehyde and potassium carbonate in excess, and also the N,N-dimethylformamide. The organic phase is then dried over anhydrous sodium sulfate, then the ethyl acetate is eliminated by vacuum evaporation. The aldehyde SP50 is obtained in the form of a yellow liquid with a yield of 86%.

The benzaldehyde subscript number is assayed in a manner known by those skilled in the art by $^1$H NMR (CDCl$_3$) by comparing the singlet at 6.85 ppm corresponding to the 2H of the C=C double bond of diethyl fumarate and the doublet of triplets at 7.82 ppm corresponding to the 2 aromatic protons of each benzaldehyde of a known mass of aldehyde SP50 to be assayed. The benzaldehyde subscript number of the aldehyde SP50 is equal to 3.77.

Figure 9A:
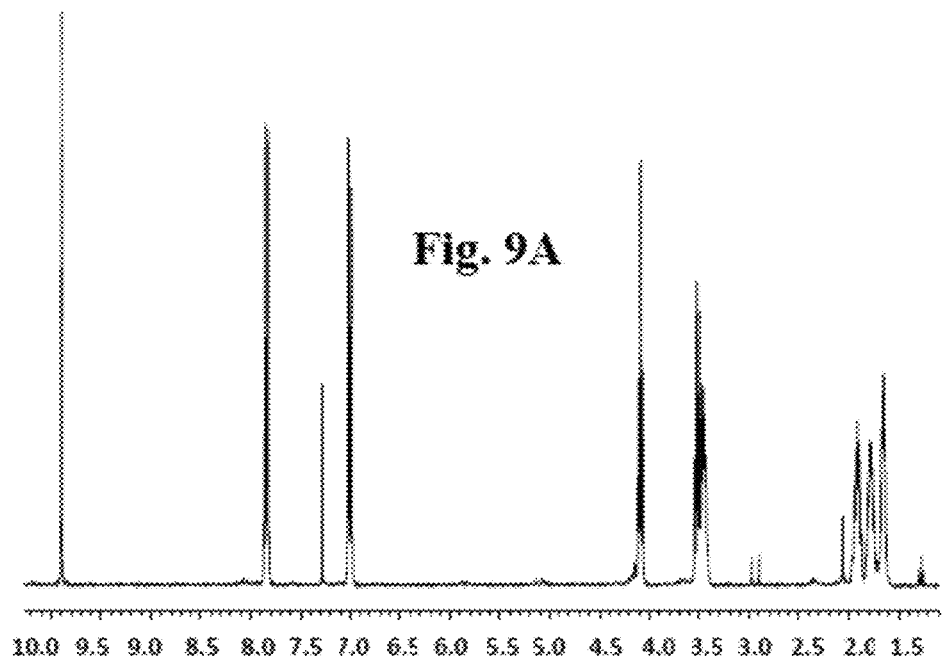
FIG. 9A is the $^1$H NMR spectrum of aldehyde SP50.
Figure 9B:
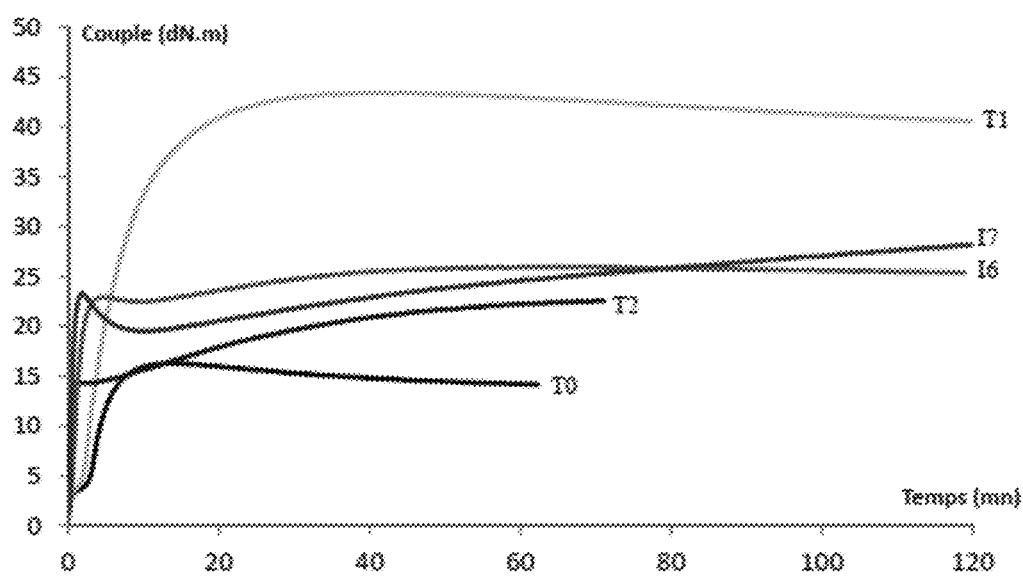
FIG. 9B is a representation of the change in the rheometric torque of related compositions of the present invention.

The $^1$H NMR spectrum of the aldehyde SP50 is represented in FIG. 9A ($^1$H NMR (CDCl$_3$, 300 MHz): 9.89 (2H, s), 7.85 (4H, d), 6.98 (4H, d), 4.08 (4H, t), 3.49 (4H+4H$_n$, m), 1.65 (8H+4H$_n$, m)).

The aldehyde of formula W of the composition I8 is also a formula W4 and has the following formula SP51:

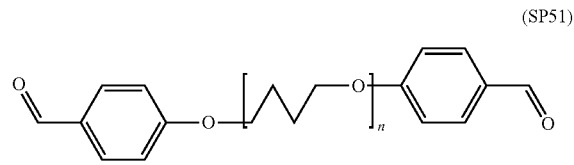

(SP51)

with n between 13 and 14.

The aldehyde SP51 is prepared in a similar manner to the aldehyde SP50 from a poly(THF) having a molar mass of around 1000 g·mol$^{-1}$ (Sigma-Aldrich reference 345296—CAS 25190-06-1).

The benzaldehyde subscript number of the aldehyde SP51 is assayed in a similar manner to that of the aldehyde SP50. The benzaldehyde subscript of the aldehyde SP51 is equal to 1.36.

Figure 10A:
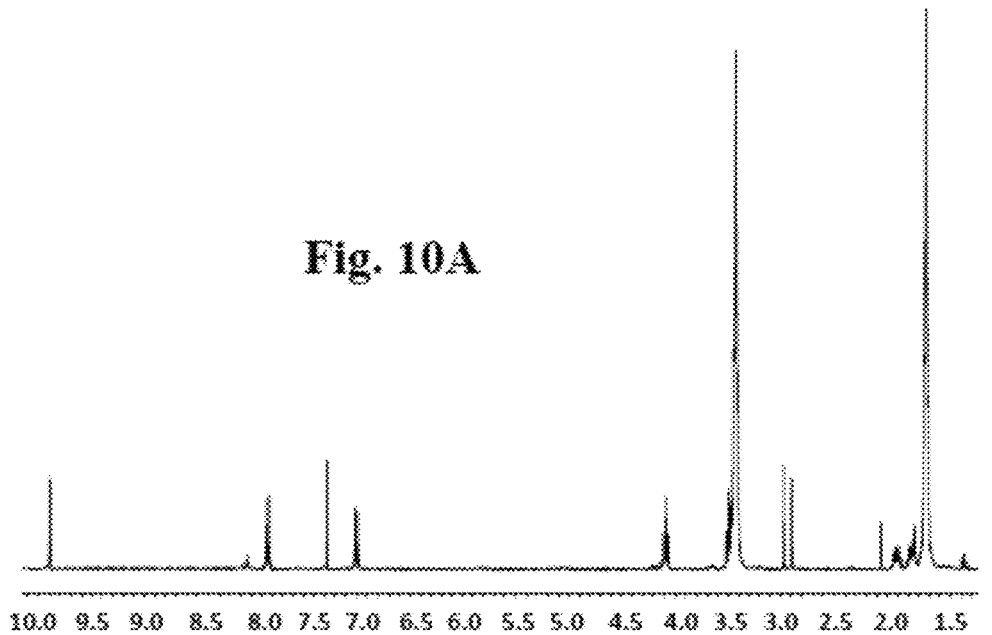
FIG. 10A is the $^1$H NMR spectrum of aldehyde SP51.
Figure 10B:
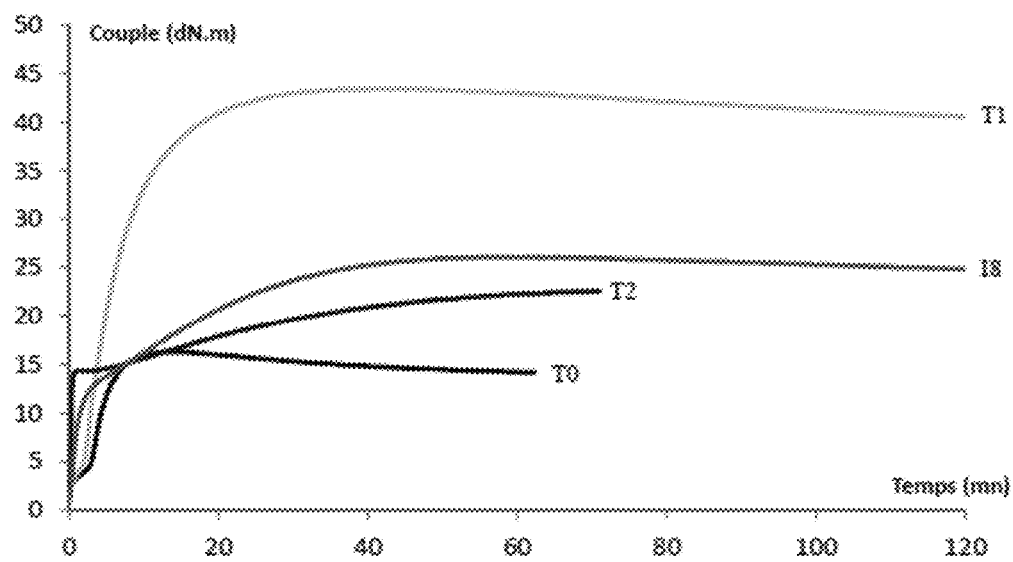
FIG. 10B is a representation of the change in the rheometric torque of related compositions of the present invention.

The $^1$H NMR spectrum of the aldehyde SP51 is represented in FIG. 10A ($^1$H NMR (CDCl$_3$, 300 MHz): 9.89 (2H, s), 7.82 (4H, d), 6.98 (4H, d), 4.08 (4H, t), 3.42 (4H+4H$_n$, m), 1.62 (8H+8H m)).

The aldehyde of formula W of the composition I9 is of formula W5 in which Y$_1$=Y$_2$=O, each ZE$_1$, ZE$_2$ radical represents a linear alkylene divalent radical, in this instance propylene, each ZE$_3$, ZE$_4$ radical represents an alkyl monovalent radical, in this instance methyl. The aldehyde of formula W of the composition I9 has the following formula SP52:

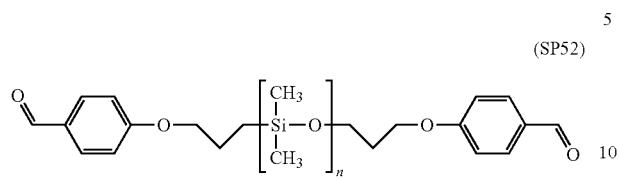

with n between 5 and 9.

The aldehyde SP52 is prepared in a similar manner to the aldehyde SP50 from a polydimethylsiloxane diol (PDMS diol) having a molar mass of between 600 and 850 g·mol$^{-1}$ (ABCR GmbH reference AB146673—CAS 104780-66-7).

The benzaldehyde subscript of the aldehyde SP52 is assayed in a similar manner to that of the aldehyde SP50. The benzaldehyde subscript of the aldehyde SP52 is equal to 2.16.

Figure 11A:
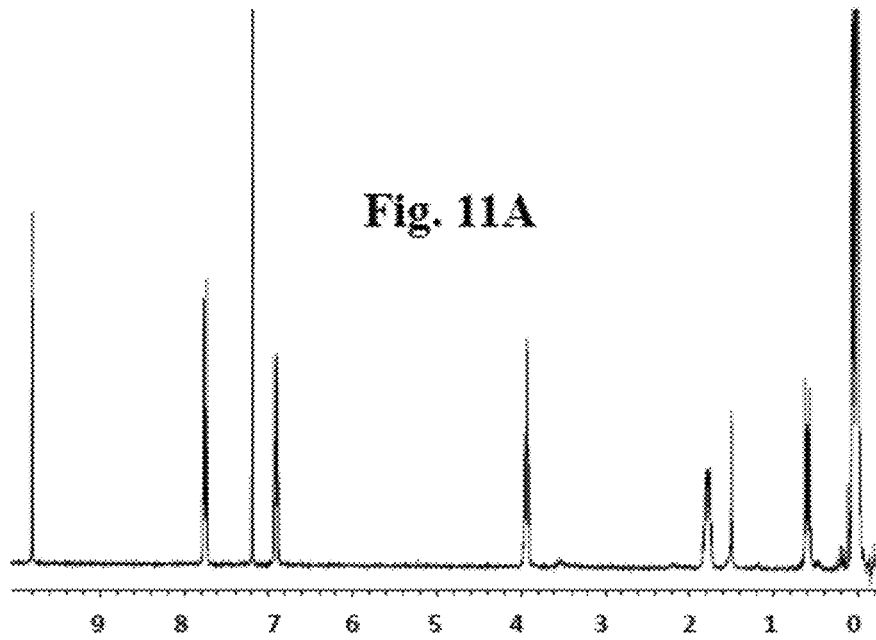
FIG. 11A is the $^1$H NMR spectrum of aldehyde SP52.
Figure 11B:
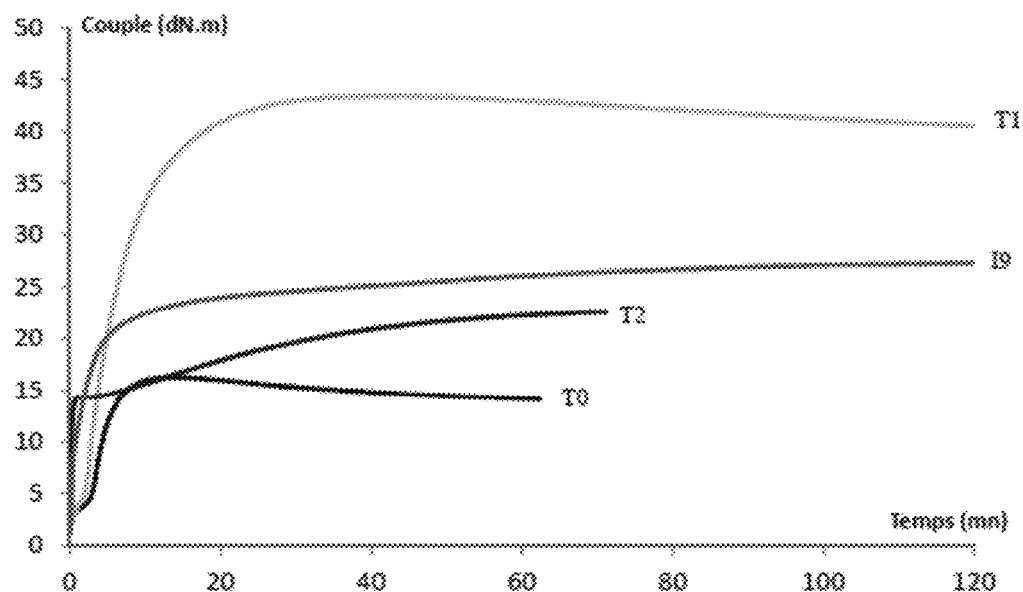
FIG. 11B is a representation of the change in the rheometric torque of related compositions of the present invention.

The $^1$H NMR spectrum of the aldehyde SP52 is represented in FIG. 11A ($^1$H NMR (CDCl$_3$, 300 MHz): 9.80 (2H, s), 7.73 (4H, m), 6.89 (4H, m), 3.93 (4H, m), 1.78 (4H, m), 0.56 (4H, m), 0.01 (6H+6H$_n$, m)).

Aldehyde of Formula W of the Composition I13

The aldehyde of formula W of the composition I13 has the following formula W2:

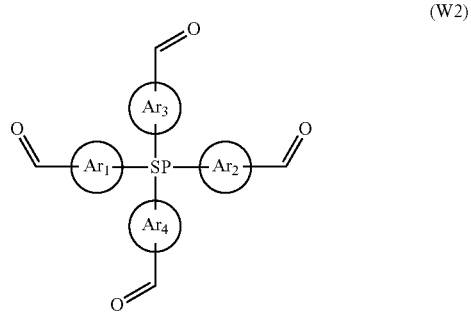

in which:
    each Ar$_3$ and Ar$_4$ group represents, independently of one another, an optionally substituted aromatic ring;
    SP connects the Ar$_1$, Ar$_2$, Ar$_3$ and Ar$_4$ groups to one another, SP separating, in twos, the Ar$_1$, Ar$_2$, Ar$_3$ and Ar$_4$ groups by at least 2 covalent bonds.

More specifically, the aldehyde of formula W of the composition I13 has the following formula SP30:

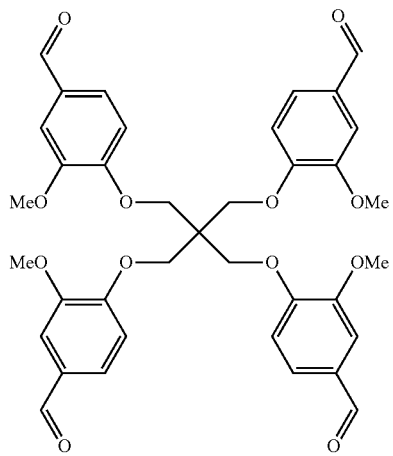

Figure 12A:
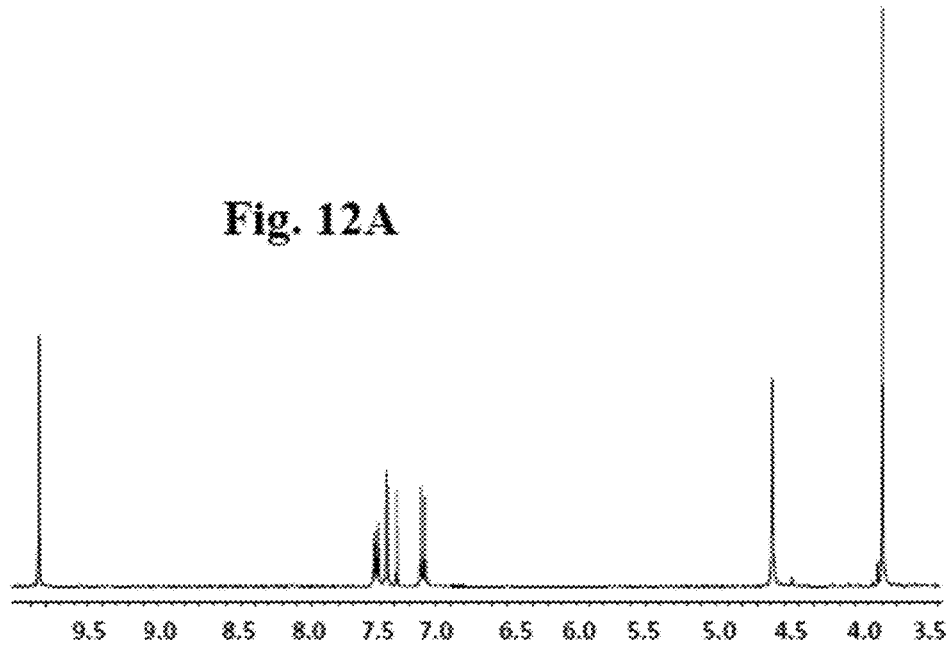
FIG. 12A is the $^1$H NMR spectrum of aldehyde SP30.
Figure 12B:
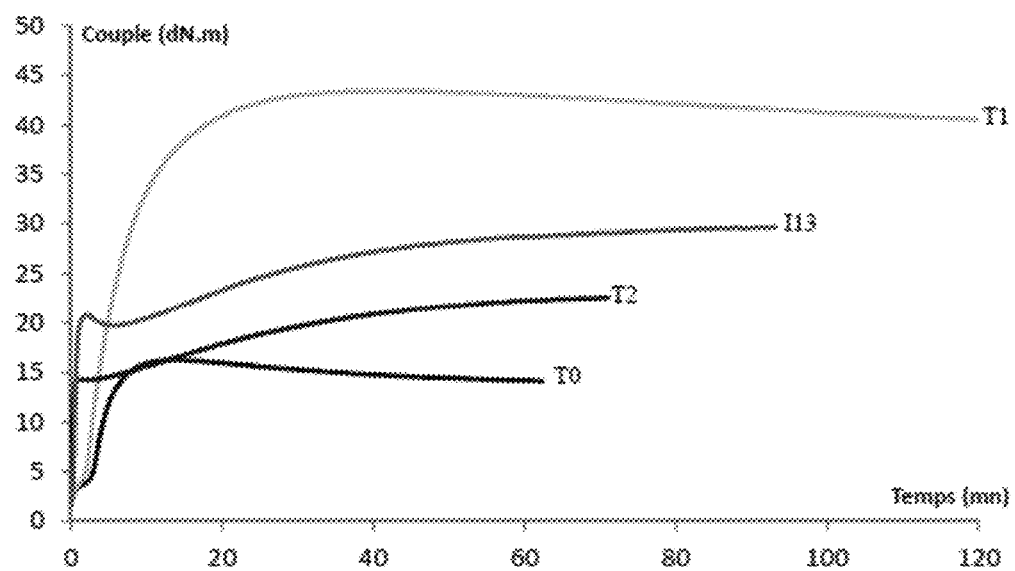
FIG. 12B is a representation of the change in the rheometric torque of related compositions of the present invention.

The aldehyde SP30 is prepared in a similar manner to the aldehyde SP10 from pentaerythritol tetrabromide (CAS 3229-00-3) and from 4-hydroxy-3-methoxybenzaldehyde (CAS 121-33-5). The $^1$H NMR spectrum of the aldehyde SP30 is represented in FIG. 12A ($^1$H NMR (CDCl$_3$, 300 MHz): 9.84 (4H, s), 7.08-7.44 (12H, m), 4.58 (8H, s), 3.79 (12H, s)).

Comparative Tests

In a first step, the reinforcing filler was incorporated into an elastomer, everything being kneaded thermomechanically until a maximum temperature of between 110° C. and 190° C. was reached. Then the combined mixture was cooled to a temperature below 110° C. Next, during a second step, the crosslinking system, the phenol/aromatic polyphenol and the methylene donor/aldehyde of formula W and optionally the additional aldehyde were incorporated. At the end of this second step, the fluidity was characterized. The mixture was also heated to 150° C. until the maximum rheometric torque was obtained (torque measured at 120 minutes) in order to vulcanize the composition and crosslink the phenol-aldehyde resin. Next, the stiffness at 23° C. of the composition was characterized during a tensile test.

Characterization of the Stiffness at High Temperature—Maximum Rheometric Torque

The measurements are carried out at 150° C. with an oscillating disc rheometer, according to standard DIN 53529—Part 3 (June 1983). The change in the rheometric torque as a function of the time describes the change in the stiffening of the composition following vulcanization and crosslinking of the phenol-aldehyde resin. The curves that represent the change in the rheometric torque of compositions I1 to I3 and also those that represent the change in the rheometric torque of compositions T0, T1 and T2 have been represented in FIGS. 2B to 12B.

The higher the maximum rheometric torque Cmax, the more the composition has a stiffness which can be retained at high temperature.

Characterization of the Stiffness at 23° C.—Tensile Test

These tests make it possible to determine the elasticity stresses and the properties at break. Unless indicated otherwise, they are carried out in accordance with standard ASTM D 412, 1998 (test specimen C). The "nominal" secant moduli (or apparent stresses, in MPa) at 10% elongation (denoted "MA10") are measured in second elongation (i.e., after an accommodation cycle). All these tensile measurements are carried out under normal temperature and relative humidity conditions, according to standard ASTM D 1349 of 1999, and are reported in Table 1.

Characterization of the Fluidity—Mooney Plasticity

The Mooney plasticity is realized using a consistometer according to Standard ASTM D1646-99. The Mooney plasticity measurement is carried out according to the following principle: the uncured mixture is moulded in a cylindrical chamber heated to a given temperature, usually 100° C. After preheating for one minute, a rotor of L type rotates within the test specimen at 2 revolutions per minute and the working torque for maintaining this movement is measured after rotating for 4 minutes. The Mooney plasticity (ML 1+4) is expressed in "Mooney unit" (MU, with 1 MU=0.83 newton.metre). This measurement is carried out less than 24 h after the manufacture of the rubber composition. The lower the Mooney plasticity, the more fluid the composition.

Firstly, the results from Table 1 show that the use of an aromatic polyphenol and of the aldehyde (4) in the control composition T2 makes it possible to obtain a stiffness at 23° C. that is much higher than that of a composition devoid of reinforcing resin (T0) but also than that of a composition comprising a reinforcing resin of the prior art (T1). However, the composition T2 has a relatively low fluidity so that the shaping of the rubber composition under conventional industrial conditions is hampered.

Unlike the composition T1, each composition according to the invention I1 to I13 has a stiffness at 23° C. that is equivalent to or even greater than that of the composition T1. Furthermore, unlike T1, none of the compositions I1 to I1 produces formaldehyde during the vulcanization thereof.

Each composition according to the invention I1 to I13 has a relatively high fluidity, significantly greater than that of the composition T2. Each composition according to the invention I1 to I13 also has a stiffness significantly greater than that of the compositions T0, T1 and T2 with the exception of example I13 which has however a stiffness significantly greater than that of the compositions T0 and T1 and sufficient to enable a reinforcement of the rubber composition.

Each composition according to the invention I1 to I13 has an improved stiffness retention at high temperatures (Cmax) compared to the retention of composition T0. Furthermore, the compositions according to the invention I1 to I13 have a stiffness retention at high temperatures (Cmax) which is at least equal (I6 and I8) or greater (I7 and I9) or considerably greater (I1 to I5 and I10 to I13) than that of the composition T2.

The invention is not limited to the embodiments described above.

In other embodiments not present in Table 1, aromatic polyphenols comprising several aromatic rings, for example benzene rings, could be envisaged, at least two of these rings each bearing at least two —O—H groups in the meta position relative to one another. The two positions ortho to at least one of the —O—H groups of each aromatic ring are unsubstituted.

TABLE 1

| Composition | Phenol | Methylene donor | Additional aldehyde | Amounts (phr) | Mooney | MA10 (MPa) | Cmax | / |
|---|---|---|---|---|---|---|---|---|
| T0 | / | / | / | 0/0/0 | <50 | 7.4 | 16 | / |
| T1 | (1) | (2) | / | 1.6/4/0 | <60 | 16.5 | 44 | / |

| Composition | Aromatic polyphenol | Aldehyde | Additional aldehyde | Molar ratio | Mooney | MA10 (MPa) | Cmax | / |
|---|---|---|---|---|---|---|---|---|
| T2 | (3) | (4) | / | 1/0, 3/0 | 100 | 24.8 | 26 | / |

| Composition | Aromatic polyphenol | Aldehyde of formula W | Additional aldehyde | Molar ratio | Mooney | MA10 (MPa) | Cmax | FIGS. |
|---|---|---|---|---|---|---|---|---|
| I1 | (3) | SP10 | / | 1/0, 3/0 | <75 | 30 | 36 | 2A, 2B |
| I2 | (5) | SP10 | / | 1/0, 3/0 | <75 | 28.2 | 48 | 2A, 2B |
| I3 | (3) | SP11 | / | 1/0, 3/0 | <90 | 40 | 55 | 3A, 3B |
| I4 | (3) | SP12 | / | 1/0, 3/0 | <60 | 50.3 | 35 | 4A, 4B |
| I5 | (3) | SP13 | / | 1/0, 3/0 | <75 | 35 | 37 | 5A, 5B |
| I6 | (3) | SP50 | / | 1/0, 3/0 | <60 | 52.4 | 26 | 9A, 9B |
| I7 | (3) | SP50 | (4) | 1/0, 1/0, 2 | <80 | 44.7 | 28 | 9A, 9B |
| I8 | (3) | SP51 | (4) | 1/0, 1/0, 2 | <60 | 43 | 26 | 10A, 10B |
| I9 | (3) | SP52 | (4) | 1/0, 1/0, 2 | <80 | 35.8 | 27 | 11A, 11B |
| I10 | (3) | SP14 | / | 1/0, 3/0 | <75 | 44.6 | 34 | 6A, 6B |
| I11 | (3) | SP15 | / | 1/0, 3/0 | <75 | 37.1 | 35 | 7A, 7B |
| I12 | (3) | SP16 | / | 1/0, 3/0 | <75 | 30.2 | 35 | 8A, 8B |
| I13 | (3) | SP30 | / | 1/0, 2/0 | <90 | 17.1 | 30 | 12A, 12B |

(1) Pre-condensed resin SRF 1524 (from Schenectady; diluted to 75%);
(2) Hexamethylenetetramine (from Sigma-Aldrich; purity of ≥99%);
(3) Phloroglucinol (from Alfa Aesar; purity of 99%);
(4) 1,4-Benzenedicarboxaldehyde (from ABCR; purity of 98%);
(5) Resorcinol (from Sumitomo; purity of 99.5%).

The invention claimed is:

1. A rubber composition comprising at least one phenol-aldehyde resin based on:
  at least one aromatic polyphenol comprising at least one aromatic ring bearing at least two —O—H groups in the meta position relative to one another, the two positions ortho to at least one of the —O—H groups being unsubstituted; and
  at least one aldehyde of formula W:

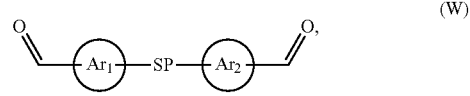

(W)

wherein each $Ar_1$ and $Ar_2$ group represents, independently of one another, an optionally substituted aromatic ring; and wherein SP is a connecting group that connects at least the $Ar_1$ and $Ar_2$ groups to one another, SP separating the $Ar_1$ and $Ar_2$ groups by at least 2 covalent bonds.

2. The rubber composition according to claim 1, wherein SP separates the $Ar_1$ and $Ar_2$ groups by a number of covalent bonds less than or equal to 150.

3. The rubber composition according to claim 1, wherein SP represents an at least divalent radical selected from the group consisting of a hydrocarbon-based radical and a substituted hydrocarbon-based radical.

4. The rubber composition according to claim 1, wherein SP separates the $Ar_1$ and $Ar_2$ groups by a number of covalent bonds greater than or equal to 3.

5. The rubber composition according to claim 1, wherein SP separates the $Ar_1$ and $Ar_2$ groups by a number of covalent bonds less than or equal to 20.

6. The rubber composition according to claim 1, wherein SP separates the $Ar_1$ and $Ar_2$ groups by a number of covalent bonds greater than 15.

7. The rubber composition according to claim 1, wherein a remainder of each $Ar_1$ and $Ar_2$ aromatic ring is unsubstituted.

8. The rubber composition according to claim 1, wherein each $Ar_1$ and $Ar_2$ aromatic ring is substituted respectively by at least one $K_1$ and $K_2$ group representing, independently of one another, a hydrocarbon-based monovalent radical and a substituted hydrocarbon-based monovalent radical.

9. The rubber composition according to claim 1, wherein the molar mass of the aldehyde is less than or equal to 10,000 g·mol$^{-1}$.

10. The rubber composition according to claim 1, wherein the at least one aromatic ring of the aromatic polyphenol bears three —O—H groups in the meta position relative to one another.

11. The rubber composition according to claim 1, wherein the two positions ortho to each —O—H group of the aromatic polyphenol are unsubstituted.

12. The rubber composition according to claim 1, wherein a remainder of the at least one aromatic ring of the aromatic polyphenol is unsubstituted.

13. The rubber composition according to claim 1, wherein the aromatic polyphenol comprises several aromatic rings, at least two of these each bearing at least two —O—H groups in the meta position relative to one another, the two positions ortho to at least one of the —O—H groups of at least one aromatic ring being unsubstituted.

14. The rubber composition according to claim 1, wherein the at least one, or each, aromatic ring of the aromatic polyphenol is a benzene ring.

15. The rubber composition according to claim 1, wherein the aromatic polyphenol is a pre-condensed resin based on:
at least one aromatic polyphenol comprising at least one aromatic ring bearing at least two hydroxyl functions in the meta position relative to one another, the two positions ortho to at least one of the hydroxyl functions being unsubstituted; and
at least one compound comprising at least one aldehyde function.

16. The rubber composition according to claim 1, wherein the aromatic polyphenol is selected from the group consisting of resorcinol, phloroglucinol, 2,2',4,4'-tetrahydroxydiphenyl sulfide, 2,2',4,4'-tetrahydroxybenzophenone and mixtures thereof.

17. The rubber composition according to claim 1 in the cured state.

18. The rubber composition according to claim 1, wherein each $Ar_1$ and $Ar_2$ aromatic ring is a benzene ring.

19. The rubber composition according to claim 18, wherein the SP group and each CHO group are located in the meta position relative to one another on each $Ar_1$ and $Ar_2$ aromatic ring.

20. A rubber composite reinforced with at least one reinforcing element embedded in the rubber composition according to claim 1.

21. A tire comprising a rubber composition according to claim 1.

22. A rubber composition comprising:
at least one aromatic polyphenol comprising at least one aromatic ring bearing at least two —O—H groups in the meta position relative to one another, the two positions ortho to at least one of the —O—H groups being unsubstituted; and
at least one aldehyde of formula W:

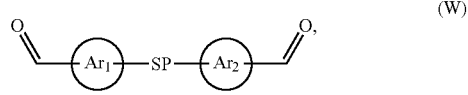

wherein each $Ar_1$ and $Ar_2$ group represents, independently of one another, an optionally substituted aromatic ring; and wherein SP is a connecting group that connects at least the $Ar_1$ and $Ar_2$ groups to one another, SP separating the $Ar_1$ and $Ar_2$ groups by at least 2 covalent bonds.

23. The rubber composition according to claim 22 in the uncured state.

24. A method for manufacturing a rubber composition in the uncured state comprising the step of mixing:
at least one aromatic polyphenol comprising at least one aromatic ring bearing at least two —O—H groups in the meta position relative to one another, the two positions ortho to at least one of the —O—H groups being unsubstituted; and
at least one aldehyde of formula W:

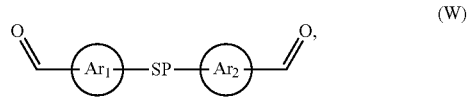

wherein each $Ar_1$ and $Ar_2$ group represents, independently of one another, an optionally substituted aromatic ring; and wherein SP is a connecting group that connects at least the $Ar_1$ and $Ar_2$ groups to one another, SP separating the $Ar_1$ and $Ar_2$ groups by at least 2 covalent bonds.

25. A method for manufacturing a rubber composition in the cured state comprising the steps of:
manufacturing a rubber composition in the uncured state comprising a step of mixing:
at least one aromatic polyphenol comprising at least one aromatic ring bearing at least two —O—H groups in the meta position relative to one another, the two positions ortho to at least one of the —O—H groups being unsubstituted; and at least one aldehyde of formula W:

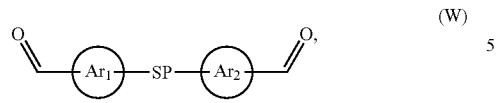

(W)

wherein each $Ar_1$ and $Ar_2$ group represents, independently of one another, an optionally substituted aromatic ring; and wherein SP is a connecting group that connects at least the $Ar_1$ and $Ar_2$ groups to one another, SP separating the $Ar_1$ and $Ar_2$ groups by at least 2 covalent bonds;

then shaping the rubber composition in the uncured state; and then vulcanizing the rubber composition during which a phenol-aldehyde resin based on the aromatic polyphenol and on the aldehyde is crosslinked.

26. The method according to claim 25 further comprising:
incorporating, in an elastomer, during a first step, a reinforcing filler, and then kneading the mixture thermomechanically until a maximum temperature of between 110° C. and 190° C. is reached;
cooling the mixture to a temperature below 110° C.; and
then incorporating, during a second step, a crosslinking system, the aromatic polyphenol and the aldehyde.

27. A rubber composition obtained by the method according to claim 25.

* * * * *